(12) United States Patent
Moriwaka

(10) Patent No.: US 9,674,469 B2
(45) Date of Patent: Jun. 6, 2017

(54) SOLID-STATE IMAGING DEVICE, METHOD OF DRIVING THE SAME, AND ELECTRONIC APPARATUS

(71) Applicant: SONY CORPORATION, Tokyo (JP)

(72) Inventor: Ryota Moriwaka, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 8 days.

(21) Appl. No.: 14/653,797

(22) PCT Filed: Dec. 12, 2013

(86) PCT No.: PCT/JP2013/083295
§ 371 (c)(1),
(2) Date: Jun. 18, 2015

(87) PCT Pub. No.: WO2014/103730
PCT Pub. Date: Jul. 3, 2014

(65) Prior Publication Data
US 2015/0326806 A1     Nov. 12, 2015

(30) Foreign Application Priority Data
Dec. 25, 2012   (JP) ................................ 2012-281370

(51) Int. Cl.
*H04N 5/369*        (2011.01)
*H04N 5/235*        (2006.01)
(Continued)

(52) U.S. Cl.
CPC ......... *H04N 5/3698* (2013.01); *H04N 5/2351* (2013.01); *H04N 5/343* (2013.01);
(Continued)

(58) Field of Classification Search
None
See application file for complete search history.

(56) References Cited

U.S. PATENT DOCUMENTS

2008/0088725 A1* 4/2008 Matsunaga .......... H04N 3/1506
                                                      348/302
2008/0170137 A1* 7/2008 Matsumoto ............ H04N 5/347
                                                      348/241
2008/0246865 A1* 10/2008 Hashimoto .......... H04N 3/1562
                                                      348/294
(Continued)

FOREIGN PATENT DOCUMENTS

| JP | 2012-028971 A | 2/2012 |
| JP | 2012-175600 A | 9/2012 |
| JP | 2012-227695 A | 11/2012 |
| JP | 2013-197612 A | 9/2013 |

*Primary Examiner* — Shahbaz Nazrul
(74) *Attorney, Agent, or Firm* — Chip Law Group

(57) ABSTRACT

The present technology relates to a solid-state imaging device that can reduce the power consumption in outputting a low-resolution image, a method of driving the solid-state imaging device, and an electronic apparatus. In the solid-state imaging device, a pixel summing unit outputs a horizontally- and vertically-summed pixel signal by combining pixel signals of pixels that are aligned in a vertical direction and have different weights, and pixel signals of pixels that are aligned in a horizontal direction and have different weights, the pixels being arranged in a matrix fashion. An AD converter unit performs AD conversion on the horizontally- and vertically-summed pixel signal that is output from the pixel summing unit. The present technology can be applied to solid-state imaging devices and the like.

9 Claims, 20 Drawing Sheets

(51) Int. Cl.
*H04N 5/343* (2011.01)
*H04N 5/355* (2011.01)
*H04N 5/374* (2011.01)
*H04N 5/353* (2011.01)
*H04N 5/378* (2011.01)
*H04N 5/347* (2011.01)
*H04N 9/04* (2006.01)
*H04N 5/345* (2011.01)

(52) U.S. Cl.
CPC .......... *H04N 5/347* (2013.01); *H04N 5/3456* (2013.01); *H04N 5/3458* (2013.01); *H04N 5/353* (2013.01); *H04N 5/35581* (2013.01); *H04N 5/374* (2013.01); *H04N 5/378* (2013.01); *H04N 9/045* (2013.01); *H04N 2209/042* (2013.01)

(56) References Cited

U.S. PATENT DOCUMENTS

| | | | |
|---|---|---|---|
| 2010/0245628 A1* | 9/2010 | Hashimoto | H04N 9/045 348/231.99 |
| 2012/0113290 A1* | 5/2012 | Nakata | H04N 5/35554 348/222.1 |
| 2012/0268630 A1* | 10/2012 | Ueda | H04N 9/04 348/272 |
| 2012/0281111 A1* | 11/2012 | Jo | H04N 5/217 348/229.1 |
| 2013/0010153 A1* | 1/2013 | Kasai | H04N 5/347 348/222.1 |
| 2013/0016238 A1* | 1/2013 | Ebihara | H04N 5/343 348/207.99 |
| 2013/0182165 A1* | 7/2013 | Kimura | H04N 5/335 348/311 |

* cited by examiner

FIG. 2

| Gb | B | Gb | B | Gb | B | Gb | B |
|----|---|----|---|----|---|----|---|
| R | Gr | R | Gr | R | Gr | R | Gr |
| Gb | B | Gb | B | Gb | B | Gb | B |
| R | Gr | R | Gr | R | Gr | R | Gr |
| Gb | B | Gb | B | Gb | B | Gb | B |
| R | Gr | R | Gr | R | Gr | R | Gr |
| Gb | B | Gb | B | Gb | B | Gb | B |
| R | Gr | R | Gr | R | Gr | R | Gr |

SOLID-STATE IMAGING DEVICE, METHOD
OF DRIVING THE SAME, AND
ELECTRONIC APPARATUS

TECHNICAL FIELD

The present technology relates to a solid-state imaging device, a method of driving the solid-state imaging device, and an electronic apparatus, and more particularly, to a solid-state imaging device that can reduce the power consumption in outputting a low-resolution image, a method of driving the solid-state imaging device, and an electronic apparatus.

BACKGROUND ART

More and more imaging apparatuses these days include imaging devices having extremely large numbers of pixels, such as millions to tens of millions of pixels, so as to perform high-resolution imaging. However, high-resolution imaging is not required in some cases. Also, if high-resolution images are recorded in a memory, a larger memory capacity is required. Therefore, priority might be given to securing a large number of images that can be recorded.

In view of such circumstances, an imaging apparatus including imaging devices with large numbers of pixels does not record pixel signals output from the imaging devices into a memory as they are, but often performs a process of reducing the total number of pixels and then performing recording on the memory through a process of reducing the number of output pixels or a synthesis process including a summation operation performed on pixels. A technology disclosing such a pixel number reduction process is Patent Document 1, for example.

CITATION LIST

Patent Document

Patent Document 1: JP 2012-175600 A

SUMMARY OF THE INVENTION

Problems to be Solved by the Invention

In a case where a low-resolution image with such a reduced number of pixels is output, it is preferable to further reduce power consumption.

The present technology has been made in view of these circumstances, and aims to reduce the power consumption in outputting a low-resolution image.

Solutions to Problems

A solid-state imaging device of a first aspect of the present technology includes: a pixel summing unit that outputs a horizontally- and vertically-summed pixel signal by combining pixel signals of pixels that are aligned in a vertical direction and have different weights, and pixel signals of pixels that are aligned in a horizontal direction and have different weights, the pixels being arranged in a matrix fashion; and an AD converter unit that performs AD conversion on the horizontally- and vertically-summed pixel signal output from the pixel summing unit.

A method of driving a solid-state imaging device of a second aspect of the present technology includes: outputting a horizontally- and vertically-summed pixel signal by combining pixel signals of pixels that are aligned in a vertical direction and have different weights, and pixel signals of pixels that are aligned in a horizontal direction and have different weights, the pixels being arranged in a matrix fashion; and performing AD conversion on the output horizontally- and vertically-summed pixel signal, the solid-state imaging device outputting the horizontally- and vertically-summed pixel signal and performing the AD conversion.

An electronic apparatus of a third aspect of the present technology includes a solid-state imaging device including: a pixel summing unit that outputs a horizontally- and vertically-summed pixel signal by combining pixel signals of pixels that are aligned in a vertical direction and have different weights, and pixel signals of pixels that are aligned in a horizontal direction and have different weights, the pixels being arranged in a matrix fashion; and an AD converter unit that performs AD conversion on the horizontally- and vertically-summed pixel signal output from the pixel summing unit.

In the first through third aspects of the present technology, a horizontally- and vertically-summed pixel signal is output by combining the pixel signals of pixels that are aligned in a vertical direction and have different weights, and the pixel signals of pixels that are aligned in a horizontal direction and have different weights, the pixels being arranged in a matrix fashion. AD conversion is performed on the output horizontally- and vertically-summed pixel signal.

The solid-state imaging device and the electronic apparatus may be independent devices, or may be internal blocks in one device.

Effects of the Invention

According to the first through third aspects of the present technology, the power consumption in outputting a low-resolution image can be reduced.

BRIEF DESCRIPTION OF DRAWINGS

FIG. 2 is a diagram showing an example of the pixel array in a pixel array unit.

MODES FOR CARRYING OUT THE INVENTION

<Example Structure of a Solid-State Imaging Device>

Figure 1:
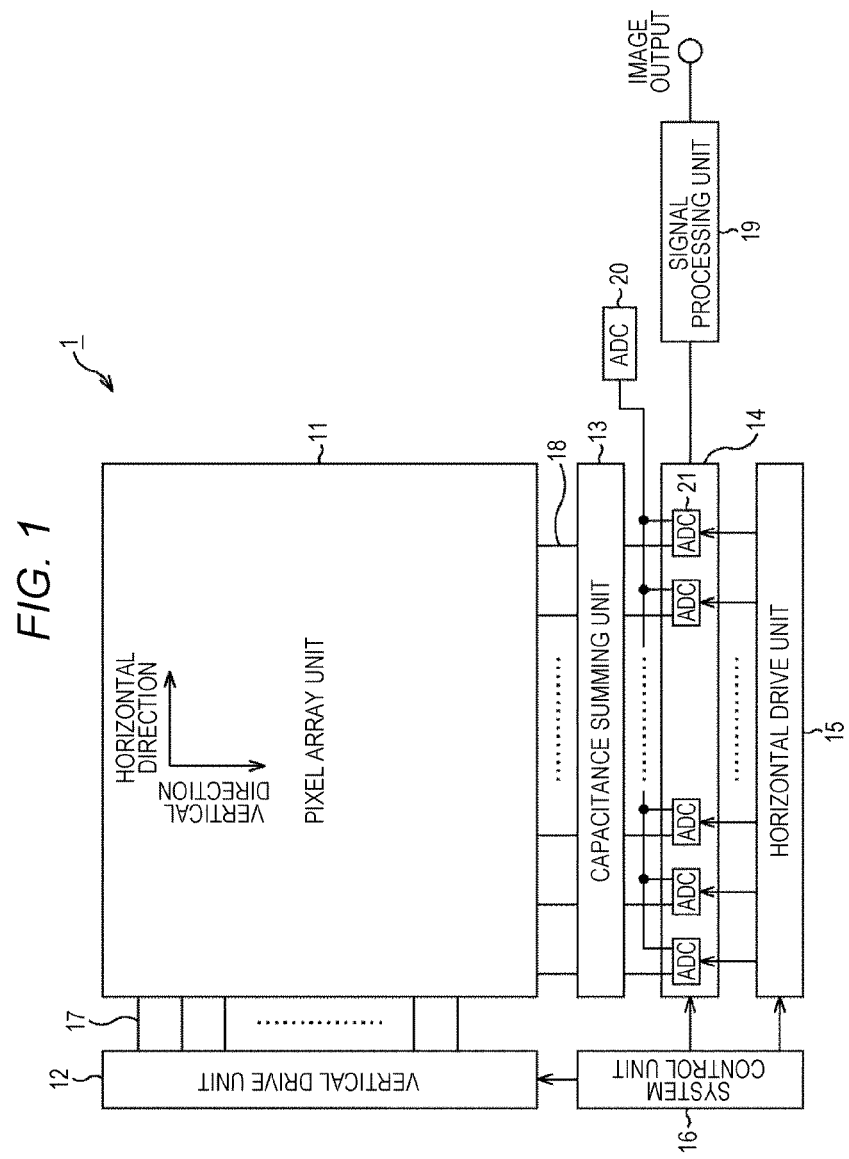
FIG. 1 is a block diagram schematically showing the structure of a solid-state imaging device to which the present technology is applied.

FIG. 1 is a block diagram schematically showing the structure of a solid-state imaging device to which the present technology is applied.

The solid-state imaging device 1 shown in FIG. 1 includes a pixel array unit 11, a vertical drive unit 12, a capacitance summing unit 13, an AD converter unit 14, a horizontal drive unit 15, a system control unit 16, pixel drive lines 17, vertical signal lines 18, a signal processing unit 19, and a DAC 20.

The pixel array unit 11 has pixels two-dimensionally arranged in the row direction and the column direction, or in a matrix fashion. The pixels each have a photoelectric conversion unit that generates and accumulates optical charges in accordance with the amount of received light. Here, the row direction means the array direction of the pixels in pixel rows, or the horizontal direction. The column direction means the array direction of the pixels in the pixel columns, or the vertical direction. The circuit configuration of each pixel will be described later in detail.

In the matrix-like pixel array of the pixel array unit 11, the pixel drive lines 17 are provided in the respective pixel rows in the horizontal direction, and the vertical signal lines 18 are provided in the respective pixel columns in the vertical direction. The pixel drive lines 17 transmit drive signals for performing driving when pixel signals are read from the pixels. In FIG. 1, each pixel drive line 17 is shown as a single wire, but is not limited to a single wire. One end of each of the pixel drive lines 17 is connected to the output end of the vertical drive unit 12 corresponding to each row.

The vertical drive unit 12 is formed with a shift register, an address decoder, and the like, and drives the respective pixels in the pixel array unit 11 collectively or row by row. The structure of the vertical drive unit 12 is not specifically shown, but normally has a structure that includes two scanning systems: a read scanning system and a sweep scanning system.

To read pixel signals from the pixels, the read scanning system sequentially selects and scans the pixels in the pixel array unit 11 row by row. The pixel signals to be read from the pixels are analog signals. The sweep scanning system performs sweep scanning on the read row on which read scanning is to be performed by the read scanning system, prior to the read scanning by the time equivalent to the shutter speed.

Through the sweep scanning by this sweep scanning system, unnecessary charges are swept out of the photoelectric conversion units of the pixels of the read row, and thus, the photoelectric conversion units are reset. As the unnecessary charges are swept (reset) by the sweep scanning system, a so-called electronic shutter operation is performed. Here, an electronic shutter operation is an operation to discard optical charges of the photoelectric conversion units, and newly start exposure (start accumulating optical charges).

The pixel signals read through the reading operation performed by the read scanning system correspond to the amount of light received after the precious reading operation or electronic shutter operation. The period from the time of reading in the previous reading operation or the time of scanning in the electronic shutter operation to the time of reading in the current reading operation is the period of exposure of the optical charges at the pixels.

The pixel signals output from the respective pixels of the pixel row selected and scanned by the vertical drive unit 12 are input to the capacitance summing unit 13 through the respective vertical signal lines 18 of the pixel columns.

The capacitance summing unit 13 includes capacitive elements (such as the capacitive elements CP shown in FIG. 8) corresponding to the pixel columns. The capacitive elements accumulate pixel signals that are input through the vertical signal lines 18. In a case where pixel signals of plural pixels are to be output as one pixel signal, the capacitance summing unit 13 combines the pixel signals of pixels aligned in the horizontal direction. Together with the vertical drive unit 12, the capacitance summing unit 13 forms a pixel summing unit that outputs horizontally- and vertically-summed pixel signals by combining the pixel signals of plural pixels in the horizontal direction and the vertical direction.

The AD converter unit 14 includes ADCs (Analog-Digital Converters) 21, and the respective ADCs 21 are arranged in accordance with the pixel columns of the pixel array unit 11. Each of the ADCs 21 performs a CDS (Correlated Double Sampling) process on the pixel signal supplied from the pixels of the corresponding column through the vertical signal line 18, and further performs an AD conversion process on the pixel signal.

A ramp signal that varies its level (voltage) in a stepwise manner with time is supplied to the ADCs 21 from a DAC (Digital to Analog Converter) 20 serving as a reference signal generating unit.

The ADCs 21 each include a comparator that compares the pixel signal output from the pixels of the corresponding column of the pixel array unit 11 with the ramp signal from the DAC 20, and a count-up/down counter that counts the comparison time of the comparator.

The comparator outputs a difference signal obtained by comparing the pixel signal with the ramp signal, to the count-up/down counter. When the ramp signal is larger than the pixel signal, for example, a difference signal of Hi (High) is supplied to the count-up/down counter. When the ramp signal is smaller than the pixel signal, a difference signal of Lo (Low) is supplied to the count-up/down counter.

The count-up/down counter counts down while the difference signal of Hi is supplied during a P-phase (Preset Phase) AD conversion period, and counts up while the Hi difference signal is supplied during a D-phase (Data Phase) AD conversion period. The count-up/down counter then outputs pixel data subjected to the CDS process and the AD conversion process. The pixel data is the result of addition of the count-down value of the P-phase AD conversion period to the count-up value of the D-phase AD conversion period. The count-up/down counter may count up during the P-phase AD conversion period, and count down during the D-phase AD conversion period.

Through this CDS process, reset noise and the fixed pattern noise unique to the pixels, such as a threshold variation among the amplifying transistors in the pixels, are removed. Through the AD conversion process, the analog pixel signals are converted into digital signals. The pixel signals subjected to the AD conversion are temporarily stored in the ADCs 21 before being output by the horizontal drive unit 15.

The horizontal drive unit 15 is formed with a shift register, an address decoder, and the like, and sequentially selects the ADCs 21 corresponding to the pixel columns of the AD converter unit 14, for example. Through selective scanning by the horizontal drive unit 15, the pixel signals temporarily stored in the ADCs 21 are sequentially output.

The system control unit 16 is formed with a timing generator that generates various timing signals, for example, and performs drive control on the vertical drive unit 12, the AD converter unit 14, and the horizontal drive unit 15 based on the various timing signals generated by the timing generator.

The signal processing unit 19 has at least an arithmetic processing function, and performs various kinds of signal processing such as arithmetic processing on the pixel signals that are output from the AD converter unit 14.

The DAC (Digital to Analog Converter) 20 generates the ramp signal that varies its level (voltage) in a stepwise manner with time, and outputs the ramp signal to each of the ADCs 21 of the AD converter unit 14.

<Example of the Pixel Array>

FIG. 2 shows an example of the pixel array in the pixel array unit 11.

In the pixel array unit 11, pixels 31 are arranged in a matrix fashion. Of the pixels 31 included in the pixel array unit 11, only the 64 pixels of eight columns (in the vertical direction) and eight rows (in the horizontal direction) are shown in FIG. 2, but the other pixels 31 are arranged in the same manner.

The array of the respective pixels 31 in the pixel array unit 11 is a Bayer array in which four pixels of R (red), Gb, (green) Gr (green), and B (blue) arranged in two rows and two columns are one set, and sets of these four pixels are repeatedly arranged in the horizontal direction and the vertical direction. In the description below, the pixels 31 of R, Gb, Gr, and B will be also referred to as R pixels, Gb pixels, Gr pixels, and B pixels.

Figure 3:
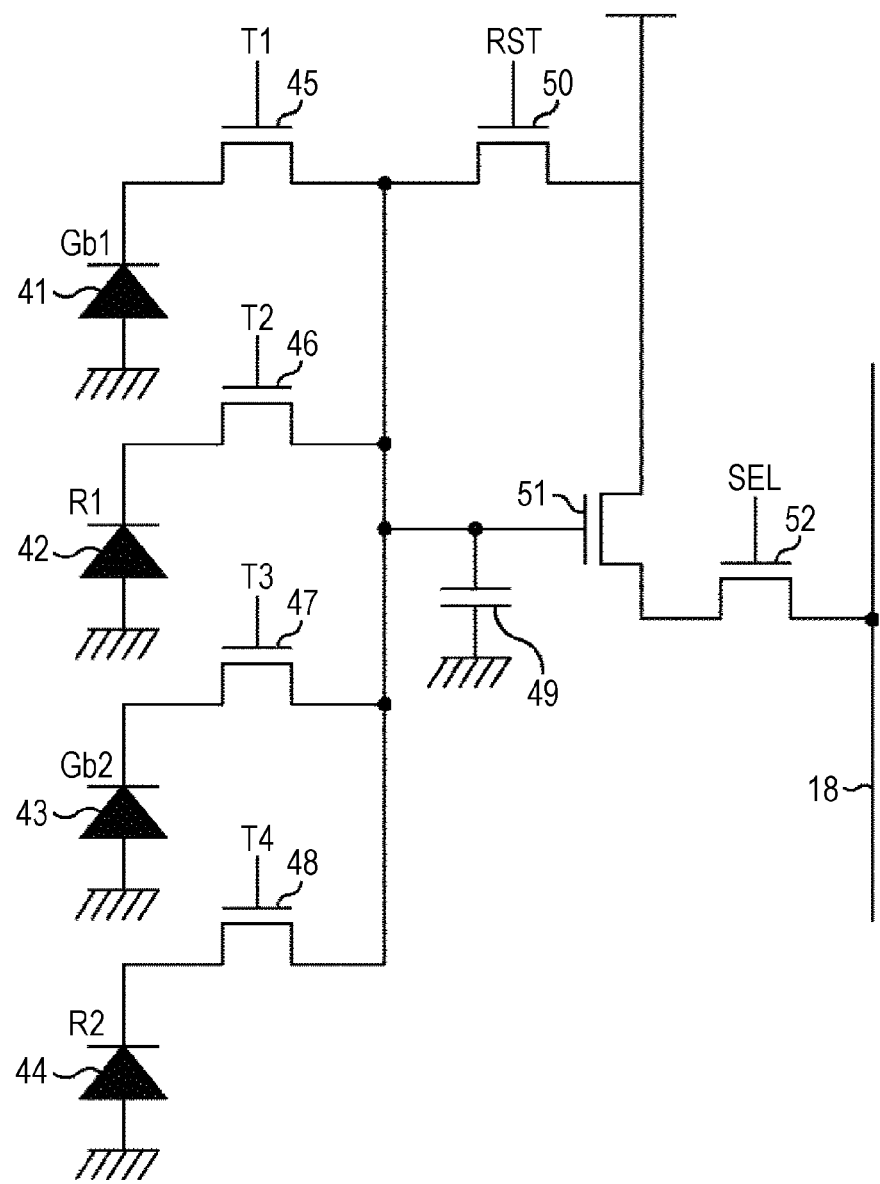
FIG. 3 is a diagram showing an example of a pixel circuit.

Of the respective pixels 31 shown in FIG. 2, the pixel circuit of a pixel region 32 formed with four pixels aligned in the vertical direction is designed as shown in FIG. 3, for example.

<Pixel Circuit Configuration>

The four pixels aligned in the vertical direction in the pixel region 32 shown in FIG. 2 are a pixel array of a Gb pixel, an R pixel, a Gb pixel, and an R pixel. Since two Gb pixels and two R pixels are included, the pixels 31 in the pixel region 32 are referred to as a Gb1 pixel, an R1 pixel, a Gb2 pixel, and an R2 pixel from the top in FIG. 3, for ease of explanation.

The pixel region 32 includes photoelectric conversion units 41 through 44, transfer transistors 45 through 48, an FD (floating diffusion) 49, a reset transistor 50, an amplifying transistor 51, and a select transistor 52.

Each of the photoelectric conversion units 41 through 44 is formed with a PN-junction photodiode, and generates and accumulates optical charges by receiving light.

When a drive signal T1 enters an active state, the transfer transistor 45 enters a conductive state in response to that, and transfers the optical charges accumulated in the photoelectric conversion unit 41 to the FD 49. When a drive signal T2 enters an active state, the transfer transistor 46 enters a conductive state in response to that, and transfers the optical charges accumulated in the photoelectric conversion unit 42 to the FD 49. When a drive signal T3 enters an active state, the transfer transistor 47 enters a conductive state in response to that, and transfers the optical charges accumulated in the photoelectric conversion unit 43 to the FD 49. When a drive signal T4 enters an active state, the transfer transistor 48 enters a conductive state in response to that, and transfers the optical charges accumulated in the photoelectric conversion unit 44 to the FD 49.

The photoelectric conversion unit 41 and the transfer transistor 45 are placed in the pixel of the Gb1 pixel, and the photoelectric conversion unit 42 and the transfer transistor 46 are placed in the pixel of the R1 pixel. The photoelectric conversion unit 43 and the transfer transistor 47 are placed in the pixel of the Gb2 pixel, and the photoelectric conversion unit 44 and the transfer transistor 48 are placed in the pixel of the Gb2 pixel.

The FD 49 accumulates the optical charges supplied from the photoelectric conversion units 41 through 44.

When a drive signal RST enters an active state, the reset transistor 50 enters a conductive state in response to that, and resets the potential of the FD 49 to a predetermined level (reset voltage).

The amplifying transistor 51 has its source electrode connected to the vertical signal line 18 via the select transistor 52, to form a source follower circuit together with the load MOS of a constant-current source circuit unit (not shown) connected to one end of the vertical signal line 18.

The select transistor 52 is connected between the source electrode of the amplifying transistor 51 and the vertical signal line 18. A drive signal SEL is applied as a select signal to the gate electrode of the select transistor 52. When the drive signal SEL enters an active state, the select transistor 52 enters a conductive state in response to that, puts the pixel region 32 into a selected state, and outputs the pixel signal output from the amplifying transistor 51 to the vertical signal line 18.

As described above, the photoelectric conversion units 41 through 44 and the transfer transistors 45 through 48 are provided in the respective pixels 31 independently of one another in the pixel region 32, but the FD 49, the reset transistor 50, the amplifying transistor 51, and the select transistor 52 are shared among the four pixels in the pixel region 32.

In the pixel array unit 11, the circuit of the pixel region 32 formed with the four pixels shown in FIG. 3 is repeatedly provided in the vertical direction and the horizontal direction, for example. However, the pixel array unit 11 may have some other configuration as its circuit configuration.

The solid-state imaging device 1 having the above structure operates in the following operation modes: an all-pixel reading mode to output pixel signals from all the pixels in the pixel array unit 11, and a low-resolution mode to output the pixel signals of a smaller number of pixels than the number of pixels in the pixel array unit 11. In the low-resolution mode, the solid-state imaging device 1 outputs pixel signals of a reduced number of pixels by combining pixel signals of pixels 31 both in the horizontal direction and in the vertical direction of the matrix of the pixels 31.

The operation to be performed by the solid-state imaging device 1 executing the low-resolution mode is described below.

<Example of 2×2 Pixel Summing Mode>

First, processing in a 2×2 pixel summing mode to output a summed pixel signal generated by combining pixel signals of two pixels of the same color in each pixel row and each pixel column is described.

Figure 4:
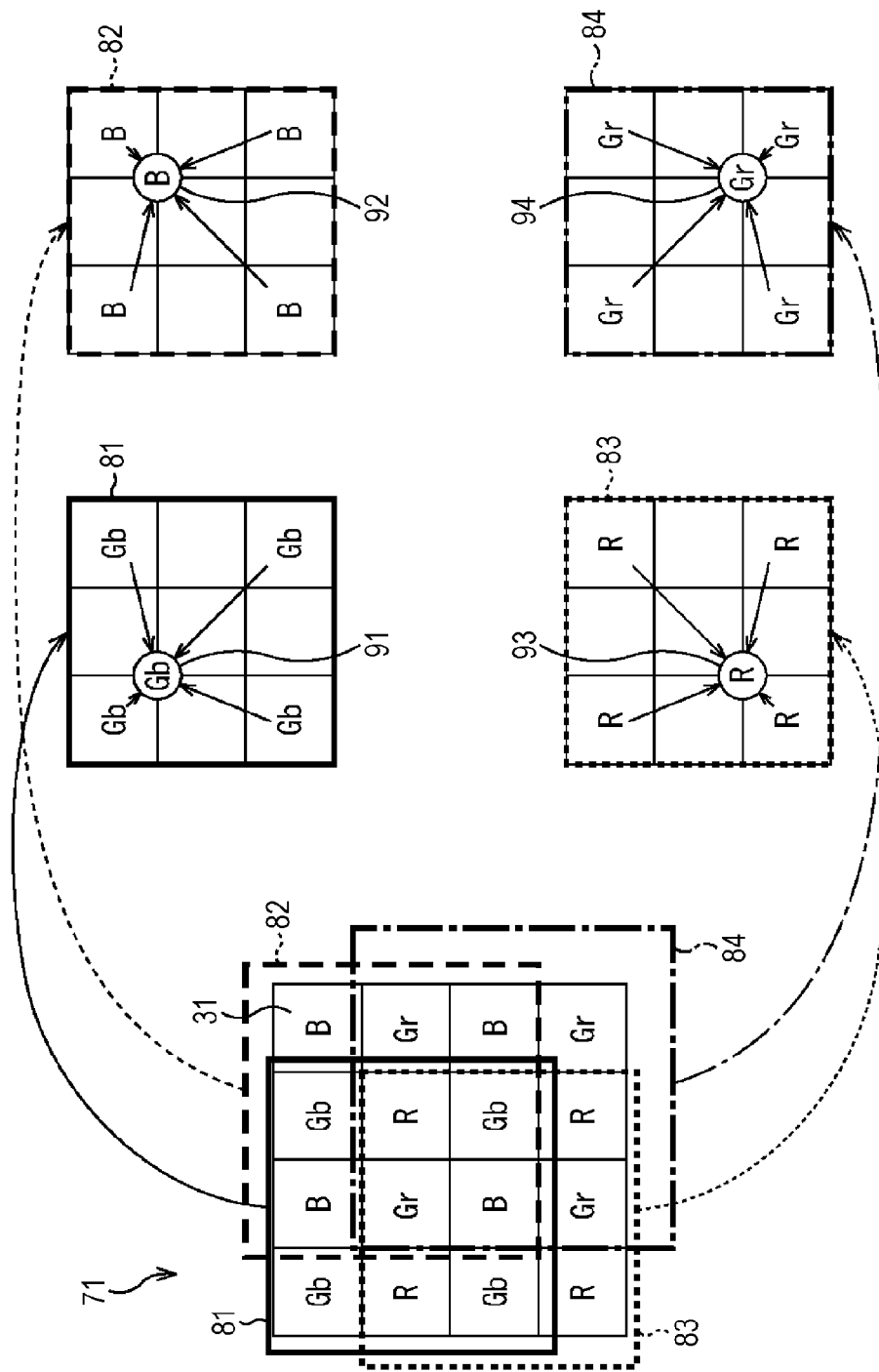
FIG. 4 is a diagram for explaining processing in a 2×2 pixel summing mode.

A pixel block 71 shown in FIG. 4 is a pixel region formed with 4×4 pixels, which is the unit of processing in the 2×2 pixel summing mode.

The Gb pixel signal in the 2×2 pixel summing mode is determined by combining the pixel signals of the four Gb pixels included in the 3×3 pixel block 81 in the upper left of the pixel block 71. At this point, the solid-state imaging device 1 performs control so that the position of the gravity center 91 in combining the pixel signals of the four Gb pixels is located at the upper left corner of the center pixel of the pixel block 81 as shown in FIG. 4. In the horizontal direction, the position of the gravity center 91 is equivalent to the position determined by dividing the distance between the two Gb pixels in the same row at a distance ratio of 1:3. In the vertical direction, the position of the gravity center 91 is equivalent to the position determined by dividing the distance between the two Gb pixels in the same column at a distance ratio of 1:3.

Also, the B pixel signal in the 2×2 pixel summing mode is determined by combining the pixel signals of the four B pixels included in the 3×3 pixel block 82 in the upper right of the pixel block 71. At this point, the solid-state imaging device 1 performs control so that the position of the gravity center 92 in combining the pixel signals of the four B pixels is located at the upper right corner of the center pixel of the pixel block 82 as shown in FIG. 4. In the horizontal direction, the position of the gravity center 92 is equivalent to the position determined by dividing the distance between the two B pixels in the same row at a distance ratio of 1:3. In the vertical direction, the position of the gravity center 92 is equivalent to the position determined by dividing the distance between the two B pixels in the same column at a distance ratio of 1:3.

Likewise, the R pixel signal in the 2×2 pixel summing mode is determined by combining the pixel signals of the four R pixels included in the 3×3 pixel block 83 in the lower left of the pixel block 71. At this point, the solid-state imaging device 1 performs control so that the position of the gravity center 93 in combining the pixel signals of the four R pixels is located at the lower right corner of the center pixel of the pixel block 83 as shown in FIG. 4. In the horizontal direction, the position of the gravity center 93 is equivalent to the position determined by dividing the distance between the two R pixels in the same row at a distance ratio of 1:3. In the vertical direction, the position of the gravity center 93 is equivalent to the position determined by dividing the distance between the two R pixels in the same column at a distance ratio of 1:3.

Also, the Gr pixel signal in the 2×2 pixel summing mode is determined by combining the pixel signals of the four Gr pixels included in the 3×3 pixel block 84 in the lower right of the pixel block 71. At this point, the solid-state imaging device 1 performs control so that the position of the gravity center 94 in combining the pixel signals of the four Gr pixels is located at the lower right corner of the center pixel of the pixel block 84 as shown in FIG. 4. In the horizontal direction, the position of the gravity center 94 is equivalent to the position determined by dividing the distance between the two Gr pixels in the same row at a distance ratio of 1:3. In the vertical direction, the position of the gravity center 94 is equivalent to the position determined by dividing the distance between the two Gr pixels in the same column at a distance ratio of 1:3.

Figure 5:
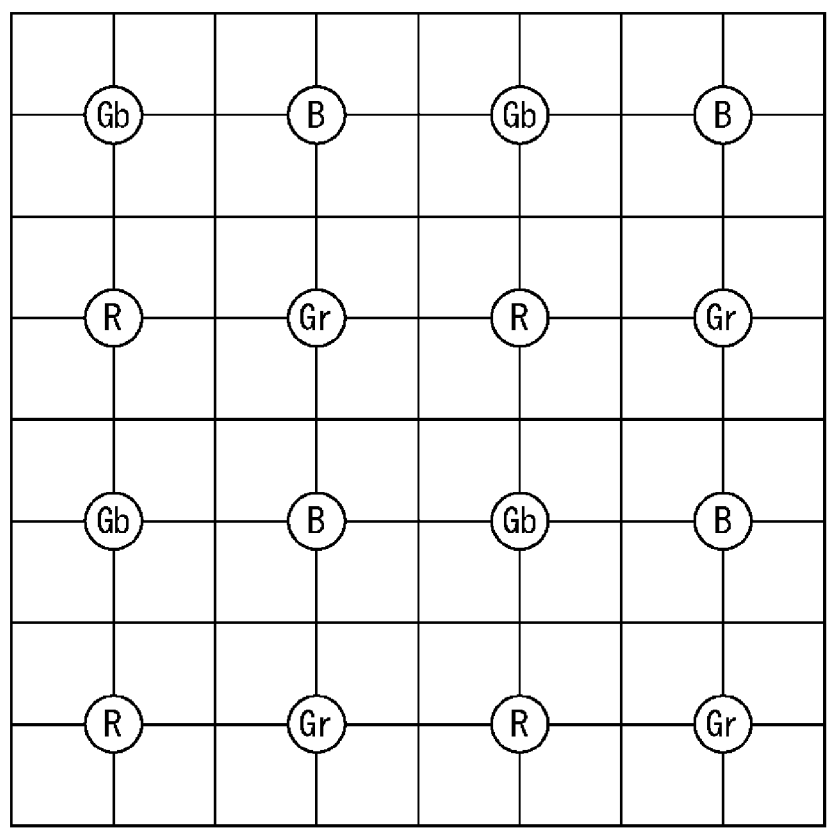
FIG. 5 is a diagram for explaining processing in the 2×2 pixel summing mode.

In the above manner the solid-state imaging device 1 causes the pixel signal output position in the pixel summing mode to shift from the center value of the pixels to be combined. As a result, the respective output positions of the R pixels, the Gb pixels, the Gr pixels, and the B pixels in the 2×2 pixel summing mode are evenly set in the entire output image as shown in FIG. 5. Accordingly, false color or the like can be reduced, and image quality deterioration when a low-resolution image is output can be reduced.

<First Pixel Summation Method>

Next, a first pixel summation method for generating a summed pixel signal by shifting a pixel signal output position from the center value of the pixels to be combined in the 2×2 pixel summing mode is described.

According to the first pixel summation method, the solid-state imaging device 1 controls the positions of gravity centers in the vertical direction by varying the exposure periods (sensitivities) for the pixels to be combined.

As for the positions of gravity centers in the horizontal direction, on the other hand, the solid-state imaging device 1 controls the positions of gravity centers by varying the capacitance ratios among the capacitive elements of the capacitance summing unit 13 that accumulates the pixel signals of the pixels to be combined.

Figure 6:
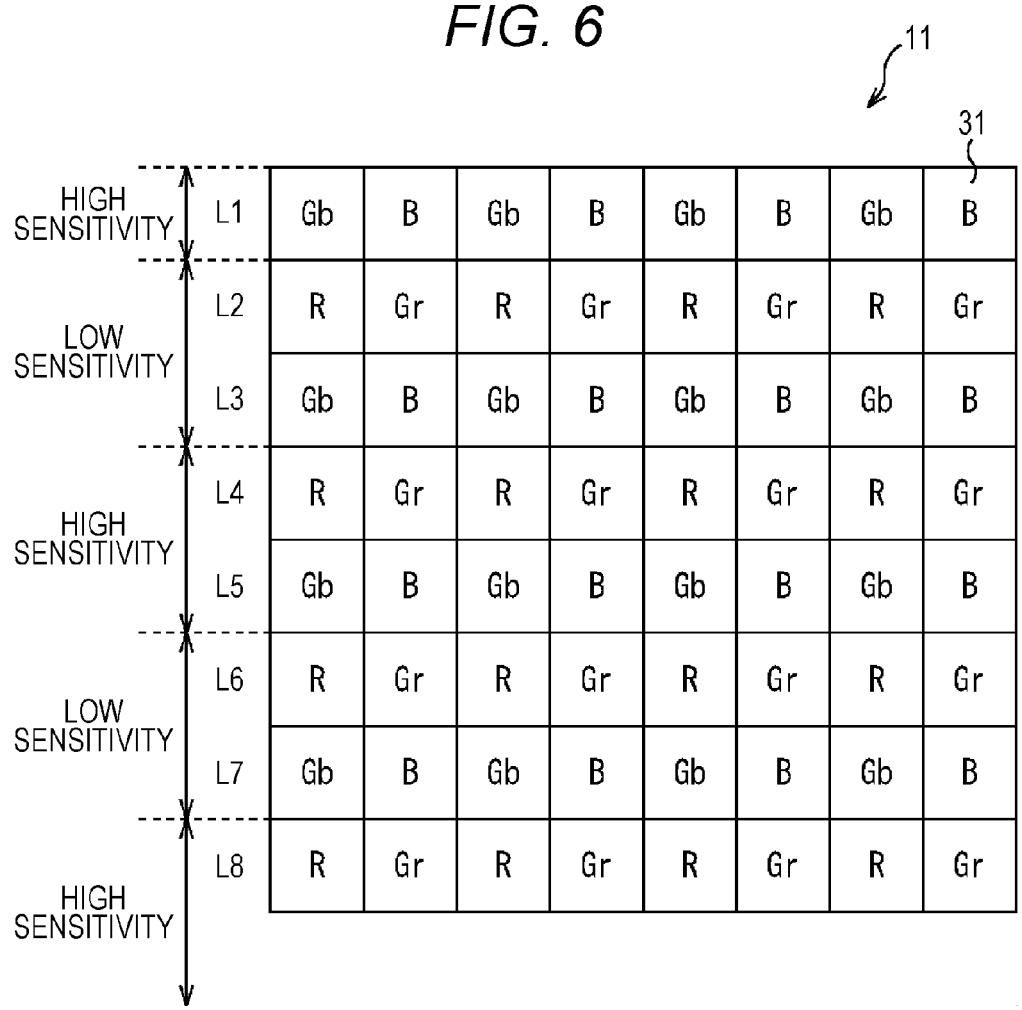
FIG. 6 is a diagram for explaining sensitivity control on pixels aligned in the vertical direction.
Figure 7:
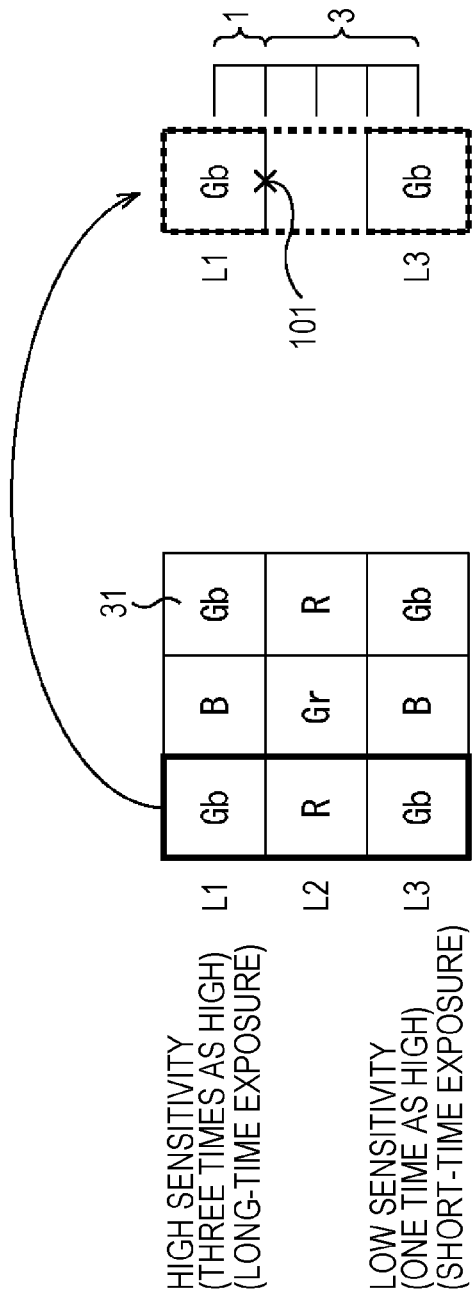
FIG. 7 is a diagram for explaining sensitivity control on pixels aligned in the vertical direction.

Referring first to FIGS. 6 and 7, control on the sensitivities of the pixels 31 in the vertical direction of the pixel array unit 11 is described.

As shown in FIG. 6, the respective pixel rows in the pixel array unit 11 are sequentially referred to as the first row (L1), the second row (L2), the third row (L3), . . . from the top. The solid-state imaging device 1 sets the respective pixels 31 of the first row as high-sensitivity pixels to be subjected to long-time exposure. Also, the solid-state imaging device 1 sets the respective pixels 31 of the second and third rows as low-sensitivity pixels to be subjected to short-time exposure, and sets the respective pixels 31 of the fourth and fifth rows as high-sensitivity pixels to be subjected to long-time exposure. Thereafter, two high-sensitivity pixel rows and two low-sensitivity pixel rows are alternately set.

Here, the sensitivity ratio between the low-sensitivity pixels to be subjected to short-time exposure and the high-sensitivity pixels to be subjected to long-time exposure is set at 1:3. That is, the ratio between the exposure period for the low-sensitivity pixels and the exposure period for the high-sensitivity pixels is 1:3.

In this case, the position of the gravity center 101 between the Gb pixel of the first row set at the high sensitivity and the Gb pixel of the third row set at the low sensitivity is located at a lower edge portion of the Gb pixel of the first row, as shown in FIG. 7. That is, the position of the gravity center 101 is equivalent to the position determined by dividing the distance between the pixel centers of the Gb pixel of the first row and the Gb pixel of the third row at the distance ratio of 1:3.

As described above, the positions of gravity centers in the vertical direction can be controlled by varying the exposure periods for the pixels to be combined.

Figure 8:
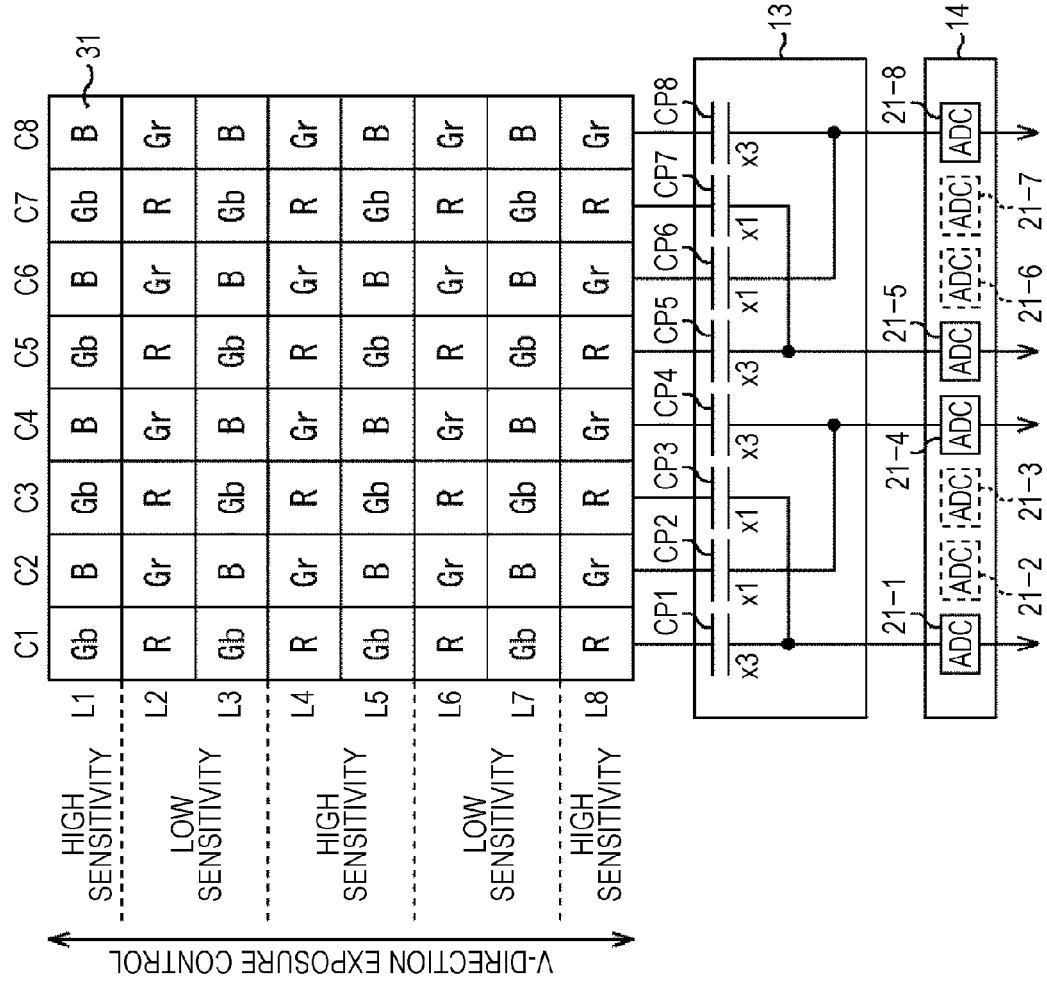
FIG. 8 is a diagram for explaining sensitivity control on pixels aligned in the horizontal direction.

Referring now to FIG. 8, control on the sensitivities of the pixels 31 in the horizontal direction of the pixel array unit 11 is described.

FIG. 8 is a diagram for explaining the structure of the capacitance summing unit 13 in a case where the 2×2 pixel summing mode is executed according to the first pixel summation method.

FIG. 8 shows a portion (an 8×8 pixel array) of the pixel array unit 11, and the structures of the capacitance summing unit 13 and the AD converter unit 14 corresponding to the portion.

As shown in FIG. 8, the capacitance summing unit 13 includes capacitive elements (capacitors) CP corresponding to the pixel columns of the pixel array unit 11. The respective capacitive elements CP of the capacitance summing unit 13 accumulate pixel signals that are supplied through the vertical signal lines 18.

In the capacitance summing unit 13, the capacitive element CP1 of the first column (C1) and the capacitive element CP3 of the third column (C3) are connected in parallel, and the capacitance ratio between the capacitive element CP1 of the first column and the capacitive element CP3 of the third column is set at CP1:CP3=3:1. The pixel signals accumulated in the capacitive element CP1 of the first column and the capacitive element CP3 of the third column are combined, and are then output to the ADC 21-1 of the first column in the AD converter unit 14.

Also, in the capacitance summing unit 13, the capacitive element CP2 of the second column (C2) and the capacitive element CP4 of the fourth column (C4) are connected in parallel, and the capacitance ratio between the capacitive element CP2 of the second column and the capacitive element CP4 of the fourth column is set at CP2:CP4=1:3. The pixel signals accumulated in the capacitive element CP2 of the second column and the capacitive element CP4 of the fourth column are combined, and are then output to the ADC 21-4 of the fourth column in the AD converter unit 14.

Likewise, the capacitive element CP5 of the fifth column (C5) and the capacitive element CP7 of the seventh column (C7) are connected in parallel, and the capacitance ratio between the capacitive element CP5 of the fifth column and the capacitive element CP7 of the seventh column is set at CP5:CP7=3:1. The pixel signals accumulated in the capacitive element CP5 of the fifth column and the capacitive element CP7 of the seventh column are combined, and are then output to the ADC 21-5 of the fifth column in the AD converter unit 14.

Also, the capacitive element CP6 of the sixth column (C6) and the capacitive element CP8 of the eighth column (C8) are connected in parallel, and the capacitance ratio between the capacitive element CP6 of the sixth column and the capacitive element CP8 of the eighth column is set at CP6:CP8=1:3. The pixel signals accumulated in the capacitive element CP6 of the sixth column and the capacitive element CP8 of the eighth column are combined, and are then output to the ADC 21-8 of the eighth column in the AD converter unit 14.

In the 2×2 pixel summing mode according to the first pixel summation method, the ADC 21-2, the ADC 21-3, the ADC 21-6, and the ADC 21-7 are not used. Accordingly, the power supply to each unused ADC 21 can be cut off, and power consumption can be reduced.

Figure 9:
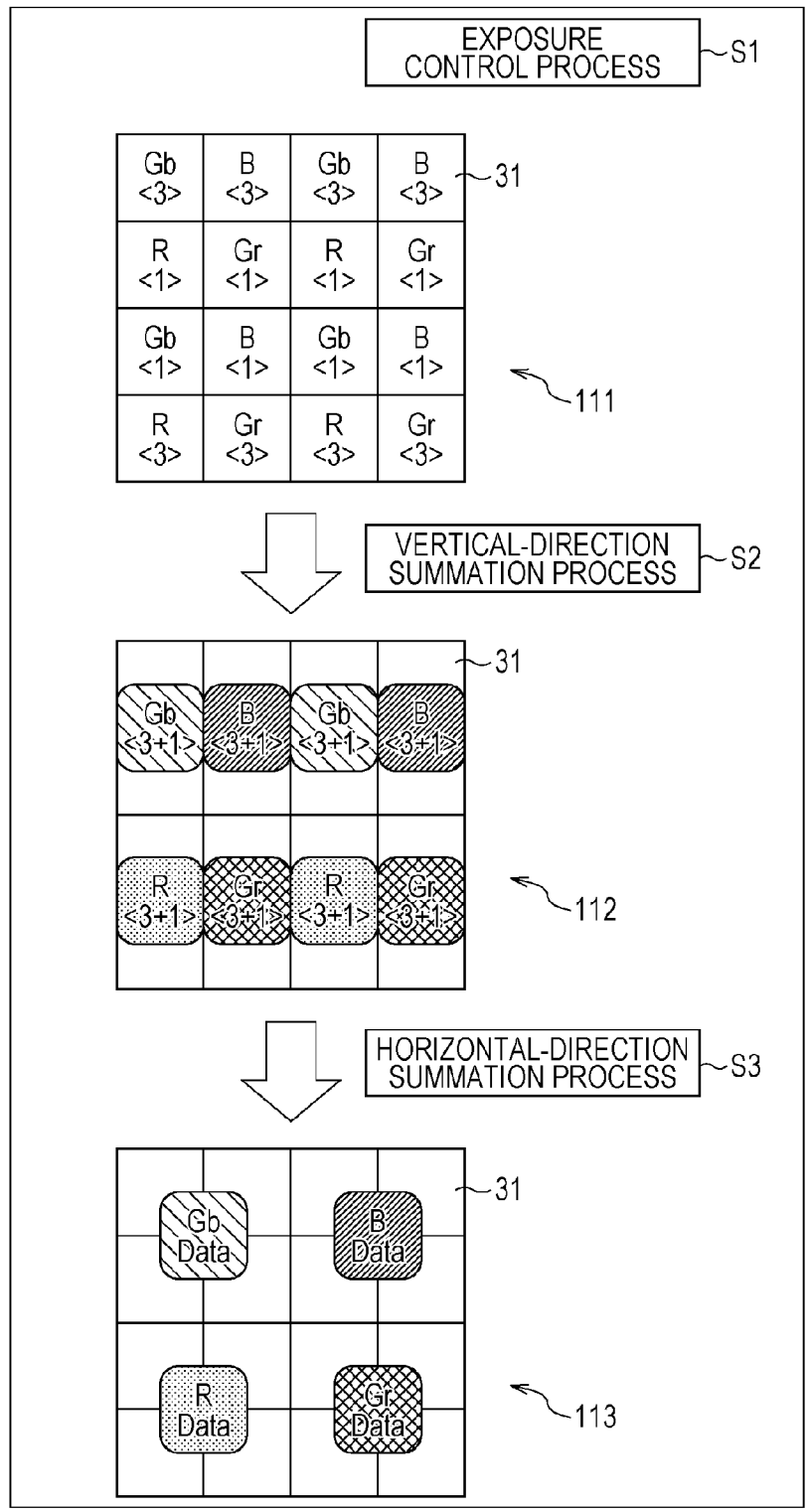
FIG. 9 is a diagram for explaining the processing procedures in the 2×2 pixel summing mode according to a first pixel summation method.

Referring now to FIG. 9, the processing procedures to be carried out in a case where the 2×2 pixel summing mode is executed according to the first pixel summation method are described.

First, in step S1, an exposure control process is performed on the respective pixels 31 in the pixel array unit 11. Through this process, a high-sensitivity or low-sensitivity exposure period is set on each of the pixel rows in the pixel array unit 11, and exposure is conducted.

A pixel map 111 shown in FIG. 9 indicates the ratios among the exposure periods for the respective 4×4 pixels 31 as the unit of processing in generating an R pixel signal, a Gb pixel signal, a Gr pixel signal, and a B pixel signal in the 2×2 pixel summing mode.

The values shown in the angle brackets in the respective pixels 31 in the pixel map 111 indicate the exposure periods for the respective pixels 31, with the reference exposure period being the exposure period (1) for the low-sensitivity pixels. The exposure period for a low-sensitivity pixel is "1", the exposure period for a high-sensitivity pixel is "3", and the exposure period ratio (sensitivity ratio) between a low-sensitivity pixel and a high-sensitivity pixel is 1:3.

In step S2, a vertical-direction summation process is performed. Specifically, the pixel signals of the low-sensitivity pixels 31 and the high-sensitivity pixels 31 aligned in the vertical direction as the current summation targets are simultaneously read, so that the pixel signals of the pixels aligned in the vertical direction as the current summation targets are combined, and are accumulated in the capacitive element CP in the capacitance summing unit 13. The capacitive element CP in the capacitance summing unit 13 accumulates the vertically-summed pixel signals generated by combining the pixel signals of the pixels aligned in the vertical direction as the current summation targets.

A pixel map 112 in FIG. 9 is a conceptual diagram showing the positions of the gravity centers of the vertically-summed pixel signals generated through the vertical-direction summation process in the 4×4 pixel region.

In the pixel map 112, each value <3+1> in the angle brackets indicates that the vertically-summed pixel signal is a signal generated by combining the pixel signal of a low-sensitivity pixel having the exposure period "1" and the pixel signal of a high-sensitivity pixel having the exposure period "3".

In step S3, a horizontal-direction summation process is performed. Specifically, the pixel signals accumulated in the capacitive elements CP to be combined in the capacitance summing unit 13 are simultaneously output, so that the pixel signals of the pixels aligned in the horizontal direction as the current summation targets are combined. The pixel signals to be combined here are vertically-summed pixel signals generated through summation processes performed in the vertical direction. Accordingly, through the process in step S3, weighted summation is performed on the pixel signals of the pixels to be combined both in the vertical direction and in the horizontal direction, to generate horizontally- and vertically-summed pixel signals.

A pixel map 113 in FIG. 9 is a conceptual diagram showing the positions of the gravity centers of the horizontally- and vertically-summed pixel signals generated through the horizontal-direction summation process in the 4×4 pixel region. The output positions of the pixel signals or R, Gb, Gr, and B shown in the pixel map 113 match the positions of the gravity centers 91 through 94 of the R pixels, the Gb pixels, the Gr pixels, and the B pixels in the pixel block 71 shown in FIG. 4. Thus, according to the first pixel summation method, the output positions of R pixels, Gb pixels, Gr pixels, and B pixels in the 2×2 pixel summing mode can be evenly set, and a low-resolution image with reduced image quality deterioration can be output.

<Drive Timing Chart>

Figure 10:
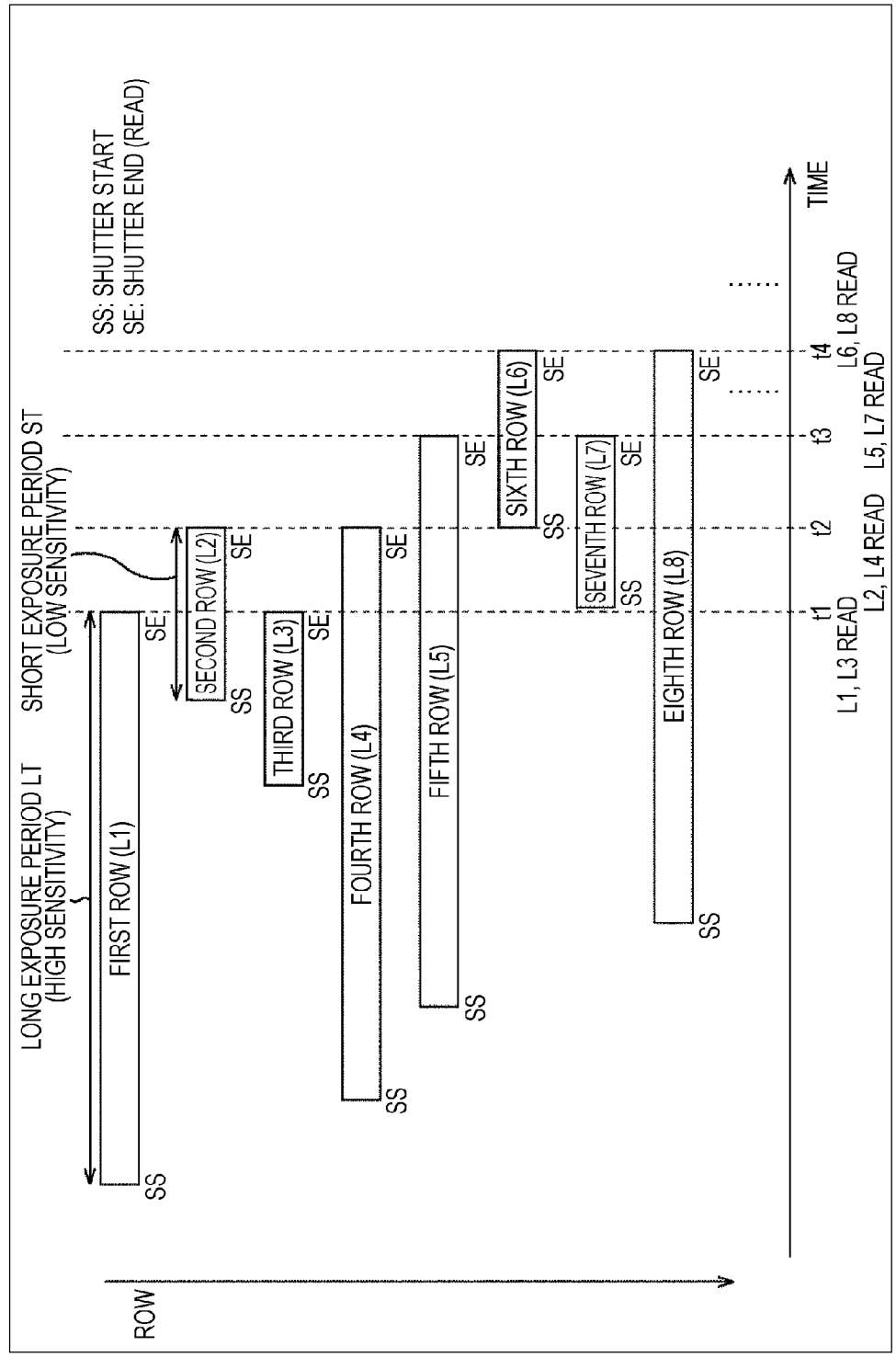
FIG. 10 is a diagram showing a timing chart of drive control on respective pixels.

FIG. 10 is a timing chart of drive control on the respective pixels 31 in the pixel array unit 11.

In each pixel 31 in each row that is set at the high sensitivity, the exposure period is set at a period LT. Meanwhile, in each pixel 31 in each row that is set at the low sensitivity, the exposure period is set at a period ST that is ⅓ of the period LT.

At time t1, the pixel signals of the respective pixels 31 of the first row (L1) exposed over the long exposure period LT and the respective pixels 31 of the third row (L3) exposed over the short exposure period ST are simultaneously read.

At time t2, the pixel signals of the respective pixels 31 of the second row (L2) exposed over the short exposure period ST and the respective pixels 31 of the fourth row (L4) exposed over the long exposure period LT are simultaneously read.

At time t3, the pixel signals of the respective pixels 31 of the fifth row (L5) exposed over the long exposure period LT and the respective pixels 31 of the seventh row (L7) exposed over the short exposure period ST are simultaneously read.

At time t4, the pixel signals of the respective pixels 31 of the sixth row (L6) exposed over the short exposure period ST and the respective pixels 31 of the eighth row (L8) exposed over the long exposure period LT are simultaneously read.

The same drive control as above is performed on the pixel signals of the respective pixels 31 of the ninth (L9) and later rows.

As described above, according to the first pixel summation method, the weights of the pixels to be combined in the vertical direction are controlled by varying exposure periods (sensitivities). The weights of the pixels to be combined in the horizontal direction are controlled by varying the capacitance ratios among the capacitive elements CP. Accordingly, horizontally- and vertically-summed pixel signals generated by combining the pixel signals of pixels having different weights in the vertical direction and the pixel signals of pixels having different weights in the horizontal direction can be output.

<Second Pixel Summation Method>

Figure 11:
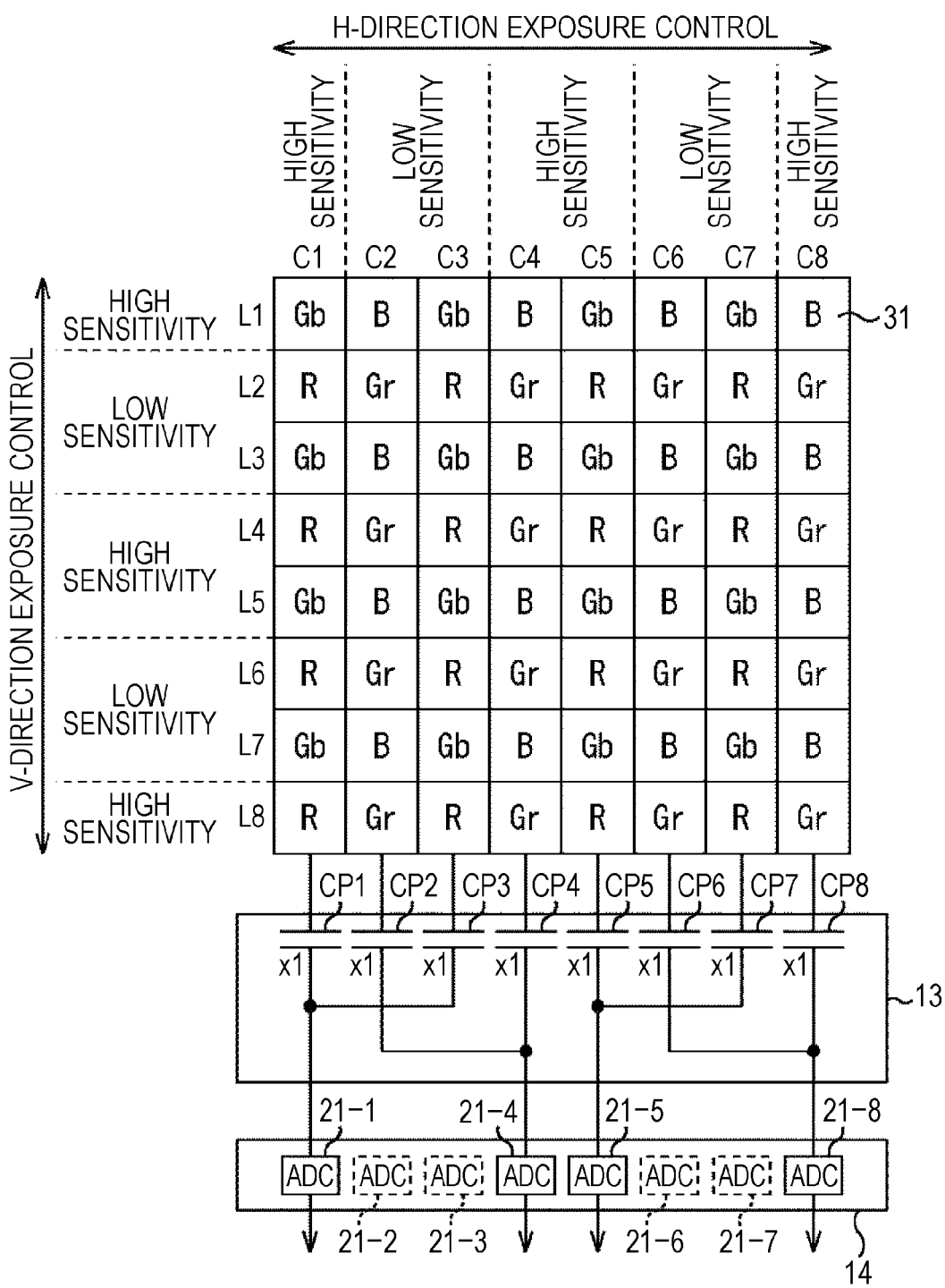
FIG. 11 is a diagram for explaining a second pixel summation method in the 2×2 pixel summing mode.

Referring now to FIG. 11, a second pixel summation method for generating a summed pixel signal by shifting a pixel signal output position from the center value of the pixels to be combined in the 2×2 pixel summing mode is described.

FIG. 11 shows the structure of the solid-state imaging device 1 in a case where the 2×2 pixel summing mode is executed according to the second pixel summation method. Like FIG. 8, FIG. 11 only partially shows the pixel array unit 11, the capacitance summing unit 13, and the AD converter unit 14.

According to the second pixel summation method, the solid-state imaging device 1 controls the positions of gravity centers both in the vertical direction and in the horizontal direction by varying the exposure periods (sensitivities) for the pixels to be combined.

Specifically, as for the vertical direction, the solid-state imaging device 1 sets the respective pixels 31 of the first row as high-sensitivity pixels to be subjected to long-time exposure. Also, the solid-state imaging device 1 sets the respective pixels 31 of the second and third rows as low-sensitivity pixels to be subjected to short-time exposure, and sets the respective pixels 31 of the fourth and fifth rows as high-sensitivity pixels to be subjected to long-time exposure. Thereafter, two high-sensitivity pixel rows and two low-sensitivity pixel rows are alternately set.

As for the horizontal direction, the solid-state imaging device 1 sets the respective pixels 31 of the first column as high-sensitivity pixels to be subjected to long-time exposure. Also, the solid-state imaging device 1 sets the respective pixels 31 of the second and third columns as low-sensitivity pixels to be subjected to short-time exposure, and sets the respective pixels 31 of the fourth and fifth columns as high-sensitivity pixels to be subjected to long-time exposure. Thereafter, two high-sensitivity pixel columns and two low-sensitivity pixel columns are alternately set.

As a technology for performing control by setting different exposure periods on the respective pixels 31 of a pixel row, the technology disclosed in JP 2004-282552 A can be employed.

According to the first pixel summation method, the weight ratios in the horizontal direction are controlled with the capacitance ratios in the capacitance summing unit 13. According to the second pixel summation method, on the other hand, the weight ratios in the horizontal direction are also controlled with the exposure period ratios, and therefore, the capacitance ratios among the capacitive elements CP to be combined are uniformly set.

Specifically, in the capacitance summing unit 13, the capacitive element CP1 of the first column and the capacitive element CP3 of the third column are connected in parallel, and the capacitance ratio between the capacitive element CP1 of the first column and the capacitive element CP3 of the third column is set at CP1:CP3=1:1. The pixel signals accumulated in the capacitive element CP1 of the first column and the capacitive element CP3 of the third column are combined, and are then output to the ADC 21-1 of the first column in the AD converter unit 14.

Also, in the capacitance summing unit 13, the capacitive element CP2 of the second column and the capacitive element CP4 of the fourth column are connected in parallel, and the capacitance ratio between the capacitive element CP2 of the second column and the capacitive element CP4 of the fourth column is set at CP2:CP4=1:1. The pixel signals accumulated in the capacitive element CP2 of the second column and the capacitive element CP4 of the fourth column are combined, and are then output to the ADC 21-4 of the fourth column in the AD converter unit 14.

The capacitive element CP5 of the fifth column and the capacitive element CP7 of the seventh column are connected in parallel, and the capacitance ratio between the capacitive element CP5 of the fifth column and the capacitive element CP7 of the seventh column is set at CP5:CP7=1:1. The pixel signals accumulated in the capacitive element CP5 of the fifth column and the capacitive element CP7 of the seventh column are combined, and are then output to the ADC 21-5 of the fifth column in the AD converter unit 14.

Also, the capacitive element CP6 of the sixth column and the capacitive element CP8 of the eighth column are connected in parallel, and the capacitance ratio between the capacitive element CP6 of the sixth column and the capacitive element CP8 of the eighth column is set at CP6:CP8=1:1. The pixel signals accumulated in the capacitive element CP6 of the sixth column and the capacitive element CP8 of the eighth column are combined, and are then output to the ADC 21-8 of the eighth column in the AD converter unit 14.

In the 2×2 pixel summing mode according to the second pixel summation method, the ADC 21-2, the ADC 21-3, the ADC 21-6, and the ADC 21-7 are not used, either. Accordingly, the power supply to each unused ADC 21 can be cut off, and power consumption can be reduced.

Figure 12:
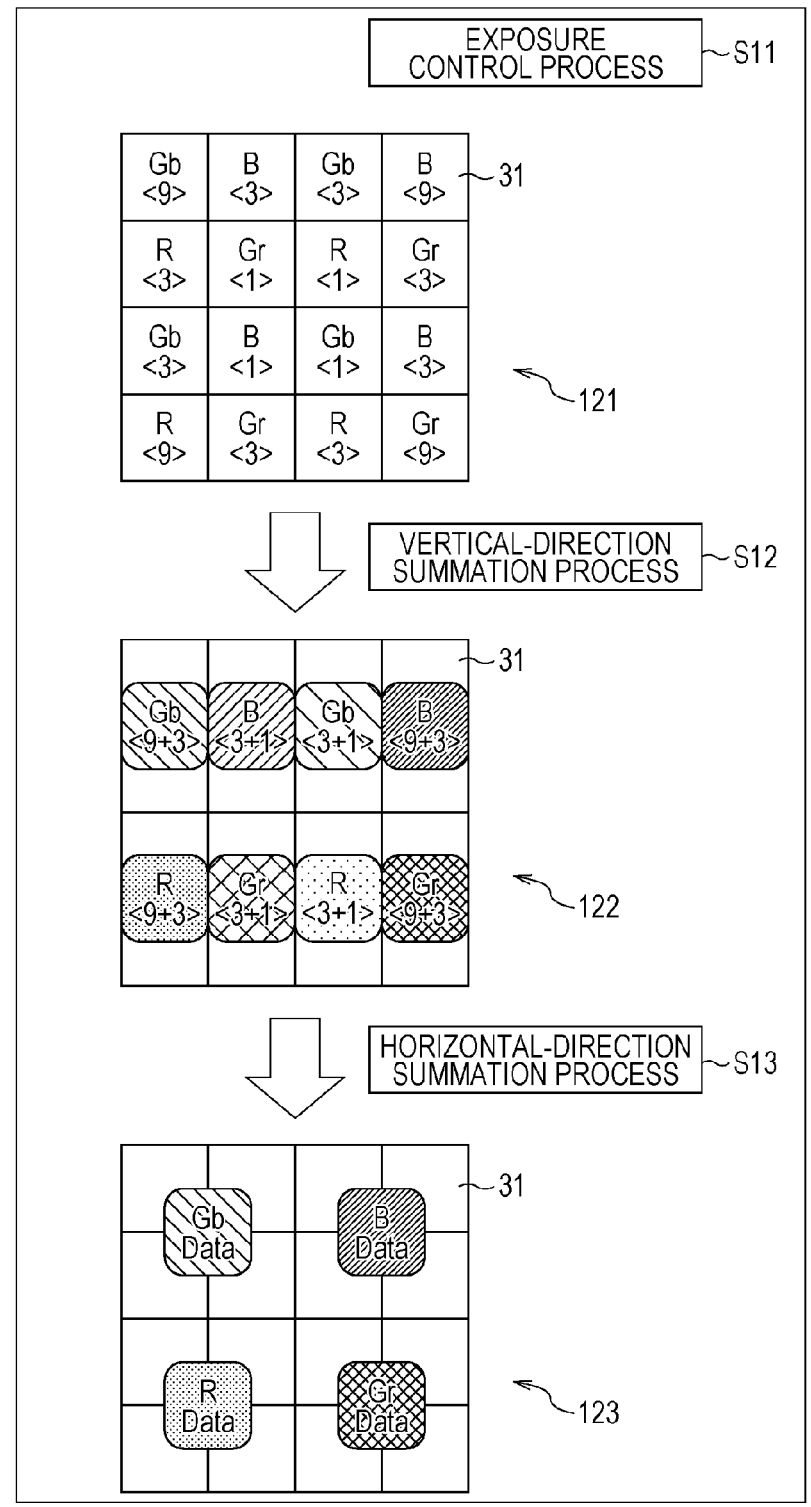
FIG. 12 is a diagram for explaining the processing procedures in the 2×2 pixel summing mode according to the second pixel summation method.

Referring now to FIG. 12, the processing procedures to be carried out in a case where the 2×2 pixel summing mode is executed according to the second pixel summation method are described.

First, in step S11, an exposure control process is performed on the respective pixels 31 in the pixel array unit 11. Through this process, a predetermined exposure period is set on each of the pixels 31 in the pixel array unit 11, and exposure is conducted.

A pixel map 121 shown in FIG. 12 indicates the ratios among the exposure periods for the respective 4×4 pixels 31 as the unit of processing in generating an R pixel signal, a Gb pixel signal, a Gr pixel signal, and a B pixel signal in the 2×2 pixel summing mode.

The values shown in the angle brackets in the respective pixels 31 in the pixel map 121 indicate the exposure periods for the respective pixels 31, with the reference period being the exposure period (1) for the pixels 31 having the shortest exposure period. The exposure period for the pixels 31 that are set at the low sensitivity both in the horizontal direction and in the vertical direction is <1>, the exposure period for the pixels 31 that are set at the high sensitivity only either in the horizontal direction or in the vertical direction is <3>, and the exposure period for the pixels 31 that are set at the high sensitivity both in the horizontal direction and in the vertical direction is <9>.

In step S12, a vertical-direction summation process is performed. Specifically, the pixel signals of the low-sensitivity pixels 31 and the high-sensitivity pixels 31 aligned in the vertical direction as the current summation targets are simultaneously read, so that the pixel signals of the pixels aligned in the vertical direction as the current summation targets are combined, and are accumulated in the capacitive element CP in the capacitance summing unit 13. The capacitive element CP in the capacitance summing unit 13 accumulates the vertically-summed pixel signals generated by combining the pixel signals of the pixels aligned in the vertical direction as the current summation targets.

A pixel map 122 shown in FIG. 12 is a conceptual diagram showing the positions of the gravity centers of the vertically-summed pixel signals generated through the vertical-direction summation process in the 4×4 pixel region.

In the pixel map 122, each value <3+1> in angle brackets indicates that the vertically-summed pixel signal is a signal generated by combining a pixel signal having the exposure period "1" and a pixel signal having the exposure period "3". Also, each value <9+3> in angle brackets indicates that the vertically-summed pixel signal is a signal generated by combining a pixel signal having the exposure period "9" and a pixel signal having the exposure period "3".

In step S13, a horizontal-direction summation process is performed. Specifically, the pixel signals accumulated in the capacitive elements CP to be combined in the capacitance summing unit 13 are simultaneously output, so that the pixel signals of the pixels aligned in the horizontal direction as the current summation targets are combined. The pixel signals to be combined here are vertically-summed pixel signals generated through summation processes performed in the vertical direction. Accordingly, through the process in step S13, weighted summation is performed on the pixel signals of the pixels to be combined both in the vertical direction and in the horizontal direction, to generate horizontally- and vertically-summed pixel signals.

A pixel map 123 shown in FIG. 12 is a conceptual diagram showing the positions of the gravity centers of the horizontally- and vertically-summed pixel signals generated through the horizontal-direction summation process in the 4×4 pixel region. The output positions of the pixel signals or R, Gb, Gr, and B shown in the pixel map 123 match the positions of the gravity centers 91 through 94 of the R pixels, the Gb pixels, the Gr pixels, and the B pixels in the pixel block 71 shown in FIG. 4. Thus, according to the second pixel summation method, the output positions of R pixels, Gb pixels, Gr pixels, and B pixels in the 2×2 pixel summing mode can be evenly set, and a low-resolution image with reduced image quality deterioration can be output.

As described above, according to the second pixel summation method, the weights of pixels to be combined is controlled by varying exposure periods (sensitivities) both in the vertical direction and in the horizontal direction. Accordingly, horizontally- and vertically-summed pixel signals generated by combining the pixel signals of pixels having different weights in the vertical direction and the pixel signals of pixels having different weights in the horizontal direction can be output.

According to either of the first pixel summation method and the second pixel summation method, weighted summation is performed on the pixel signals of pixels in the horizontal direction prior to AD conversion. Accordingly, of the ADCs 21 that are the same in number as the pixel columns, half of the ADCs 21 can rest, and power consumption can be reduced. In a case where the AD converter unit 14 of the solid-state imaging device 1 is formed beforehand with ADCs 21 of half the number of the pixel columns, operation can be performed at a frame rate twice as high.

<Example of a 4×4 Pixel Summing Mode>

In the above described example, processing in the 2×2 pixel summing mode to combine pixel signals of two pixels of the same color in each pixel row and each pixel column has been described as an example of the low-resolution mode.

Next, processing in a 4×4 pixel summing mode to combine pixel signals of four pixels of the same color in each pixel row and each pixel column is described as another example of processing in the low-resolution mode.

<First Pixel Summation Method>

Figure 13:
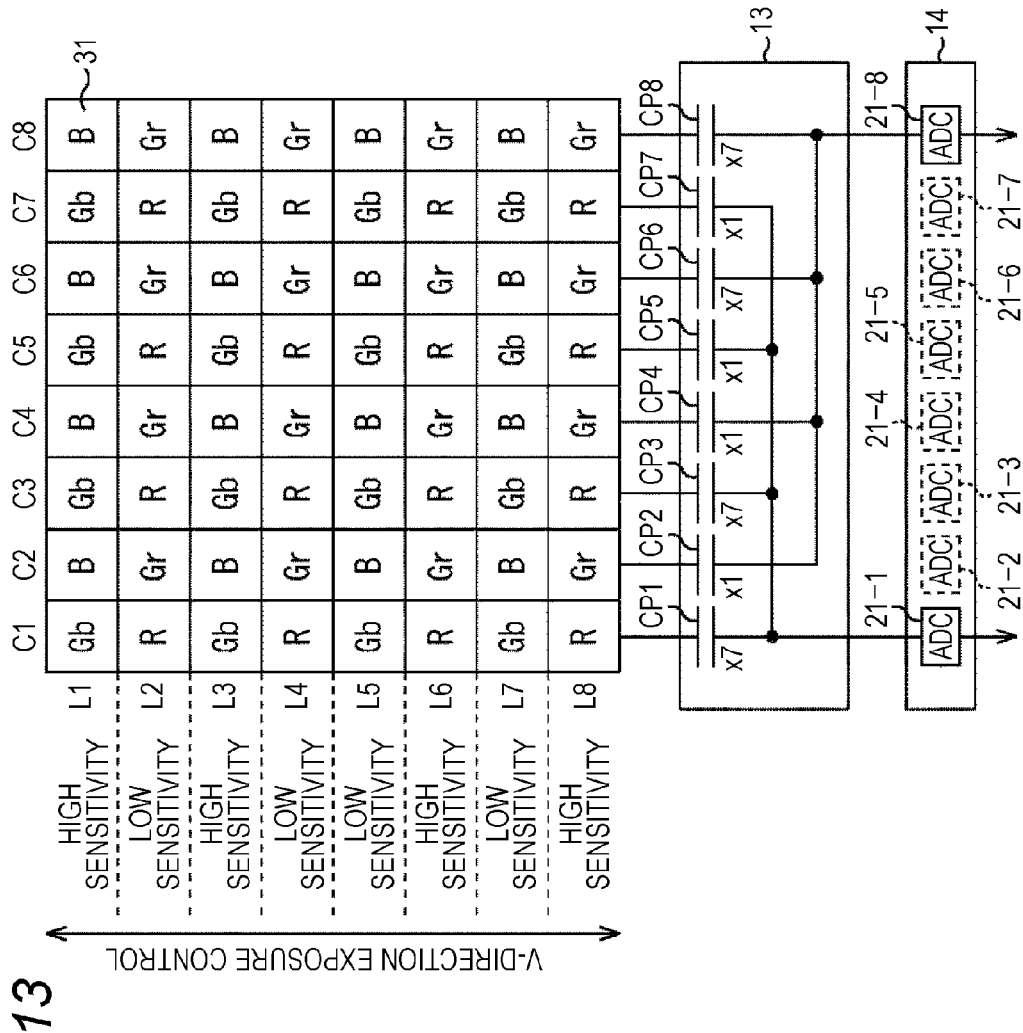
FIG. 13 is a diagram for explaining the first pixel summation method in a 4×4 pixel summing mode.

FIG. 13 shows the structure of the solid-state imaging device 1 in a case where the 4×4 pixel summing mode is executed according to the first pixel summation method.

In the 4×4 pixel summing mode, an R pixel signal, a Gb pixel signal, a Gr pixel signal, and a B pixel signal are generated from an 8×8 pixel region. Therefore, FIG. 13 shows only an 8×8 pixel region of the pixel array unit 11, and the portions of the capacitance summing unit 13 and the AD converter unit 14 corresponding to the pixel region.

In a case where the 4×4 pixel summing mode is executed according to the first pixel summation method, the solid-state imaging device 1 sets the respective pixels 31 of the first, third, sixth, and eighth rows as high-sensitivity pixels to be subjected to long-time exposure. The solid-state imaging device 1 also sets the respective pixels 31 of the second, fourth, fifth, and seventh rows as low-sensitivity pixels to be subjected to short-time exposure.

Here, the sensitivity ratio between the low-sensitivity pixels to be subjected to short-time exposure and the high-sensitivity pixels to be subjected to long-time exposure is set at 1:7. That is, the ratio between the exposure period for the low-sensitivity pixels and the exposure period for the high-sensitivity pixels is 1:7.

Meanwhile, in the capacitance summing unit 13 that performs summation in the horizontal direction, the capacitive element CP1 of the first column, the capacitive element CP3 of the third column, the capacitive element CP5 of the fifth column, and the capacitive element CP7 of the seventh column are connected in parallel. The capacitance ratio among the capacitive element CP1, the capacitive element CP3, the capacitive element CP5, and the capacitive element CP7 is set at CP1:CP3:CP5:CP7=7:7:1:1. The pixel signals accumulated in the capacitive element CP1, the capacitive element CP3, the capacitive element CP5, and the capacitive element CP7 are combined, and are then output to the ADC 21-1 of the first column in the AD converter unit 14.

Also, the capacitive element CP2 of the second column, the capacitive element CP4 of the fourth column, the capacitive element CP6 of the sixth column, and the capacitive element CP8 of the eighth column are connected in parallel. The capacitance ratio among the capacitive element CP2, the capacitive element CP4, the capacitive element CP6, and the capacitive element CP8 is set at CP2:CP4:CP6:CP8=1:1:7:7. The pixel signals accumulated in the capacitive element CP2, the capacitive element CP4, the capacitive element CP6, and the capacitive element CP8 are combined, and are then output to the ADC 21-8 of the eighth column in the AD converter unit 14.

In the 4×4 pixel summing mode according to the first pixel summation method, the ADCs 21-2 through 21-7 are not used. Accordingly, the power supply to each unused ADC 21 can be cut off, and power consumption can be reduced.

Figure 14:
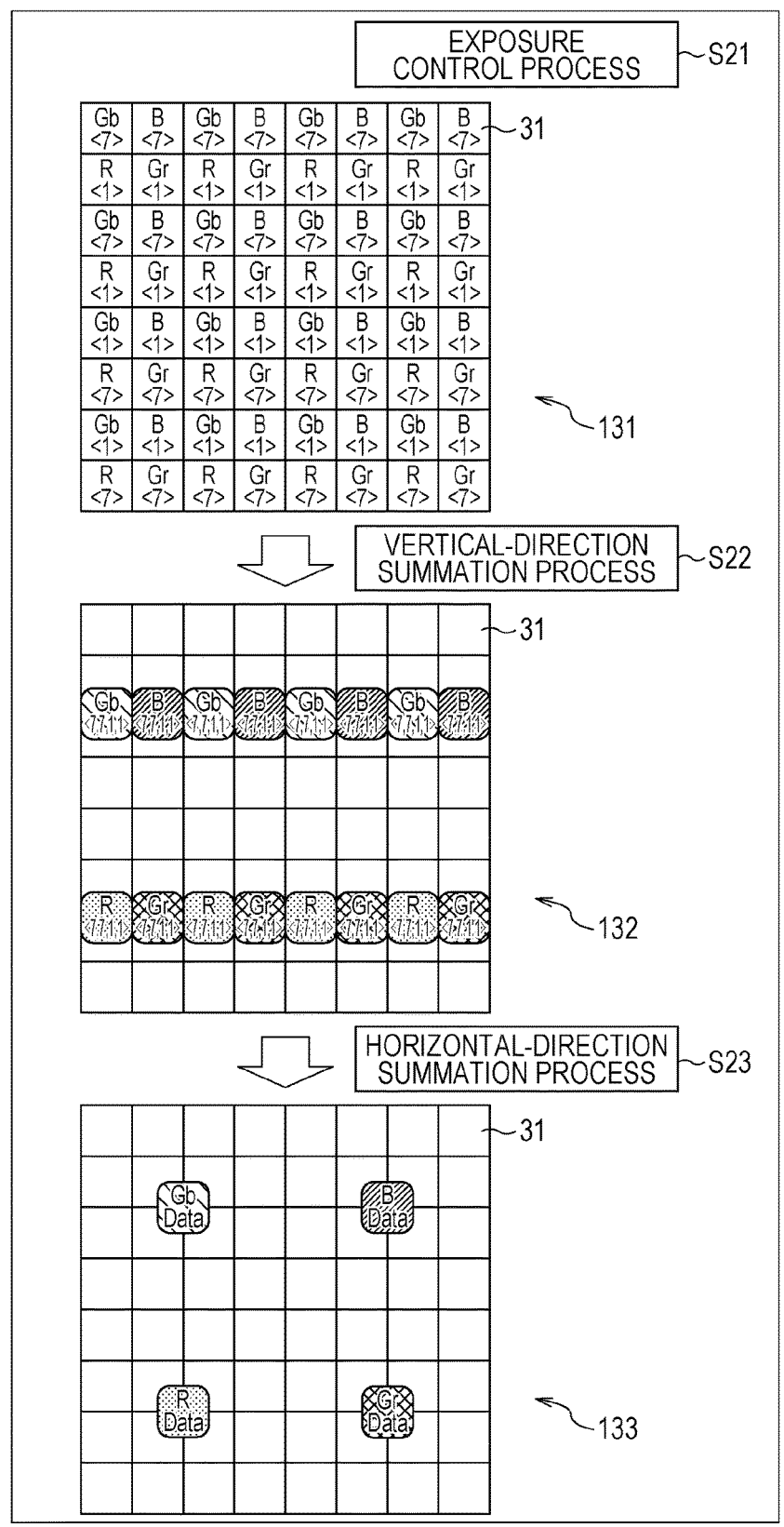
FIG. 14 is a diagram for explaining the processing procedures in the 4×4 pixel summing mode according to the first pixel summation method.

Referring now to FIG. 14, the processing procedures to be carried out in a case where the 4×4 pixel summing mode is executed according to the first pixel summation method are described.

First, in step S21, an exposure control process is performed on the respective pixels 31 in the pixel array unit 11. Through this process, a high-sensitivity or low-sensitivity exposure period is set on each of the pixel rows in the pixel array unit 11, and exposure is conducted.

A pixel map 131 shown in FIG. 14 indicates the ratios among the exposure periods for the respective 8×8 pixels 31 as the unit of processing in generating an R pixel signal, a Gb pixel signal, a Gr pixel signal, and a B pixel signal in the 4×4 pixel summing mode.

The values shown in the angle brackets in the respective pixels 31 in the pixel map 131 indicate the exposure periods for the respective pixels 31, with the reference exposure period being the exposure period (1) for the low-sensitivity pixels. The exposure period for a low-sensitivity pixel is "1", the exposure period for a high-sensitivity pixel is "7", and the exposure period ratio (sensitivity ratio) between a low-sensitivity pixel and a high-sensitivity pixel is 1:7.

In step S22, a vertical-direction summation process is performed. Specifically, the pixel signals of the low-sensitivity pixels 31 and the high-sensitivity pixels 31 aligned in the vertical direction as the current summation targets are simultaneously read, so that the pixel signals of the pixels aligned in the vertical direction as the current summation targets are combined, and are accumulated in the capacitive element CP in the capacitance summing unit 13. The capacitive element CP in the capacitance summing unit 13 accumulates the vertically-summed pixel signals generated by combining the pixel signals of the pixels aligned in the vertical direction as the current summation targets.

A pixel map 132 shown in FIG. 14 is a conceptual diagram showing the positions of the gravity centers of the vertically-summed pixel signals generated through the vertical-direction summation process in the 8×8 pixel region.

In the pixel map 132, the values <7, 7, 1, 1> in the angle brackets indicate that each vertically-summed pixel signal is a signal generated by combining the pixel signals of four pixels having exposure periods "7", "7", "1", and "1".

In step S23, a horizontal-direction summation process is performed. Specifically, the pixel signals accumulated in the capacitive elements CP to be combined in the capacitance summing unit 13 are simultaneously output, so that the pixel signals of the pixels aligned in the horizontal direction as the current summation targets are combined. The pixel signals to be combined here are vertically-summed pixel signals generated through summation processes performed in the vertical direction. Accordingly, through the process in step S23, weighted summation is performed on the pixel signals of the pixels to be combined both in the vertical direction and in the horizontal direction, to generate horizontally- and vertically-summed pixel signals.

A pixel map 133 shown in FIG. 14 is a conceptual diagram showing the positions of the gravity centers of the horizontally- and vertically-summed pixel signals generated through the horizontal-direction summation process in the 8×8 pixel region. The output positions of the pixel signals of R, Gb, Gr, and B are evenly set in the pixel map 133. Thus, according to the first pixel summation method, a low-resolution image with reduced image quality deterioration can be output.

<Second Pixel Summation Method>

Next, a case where the 4×4 pixel summing mode is executed according to the second pixel summation method is described.

Figure 15:
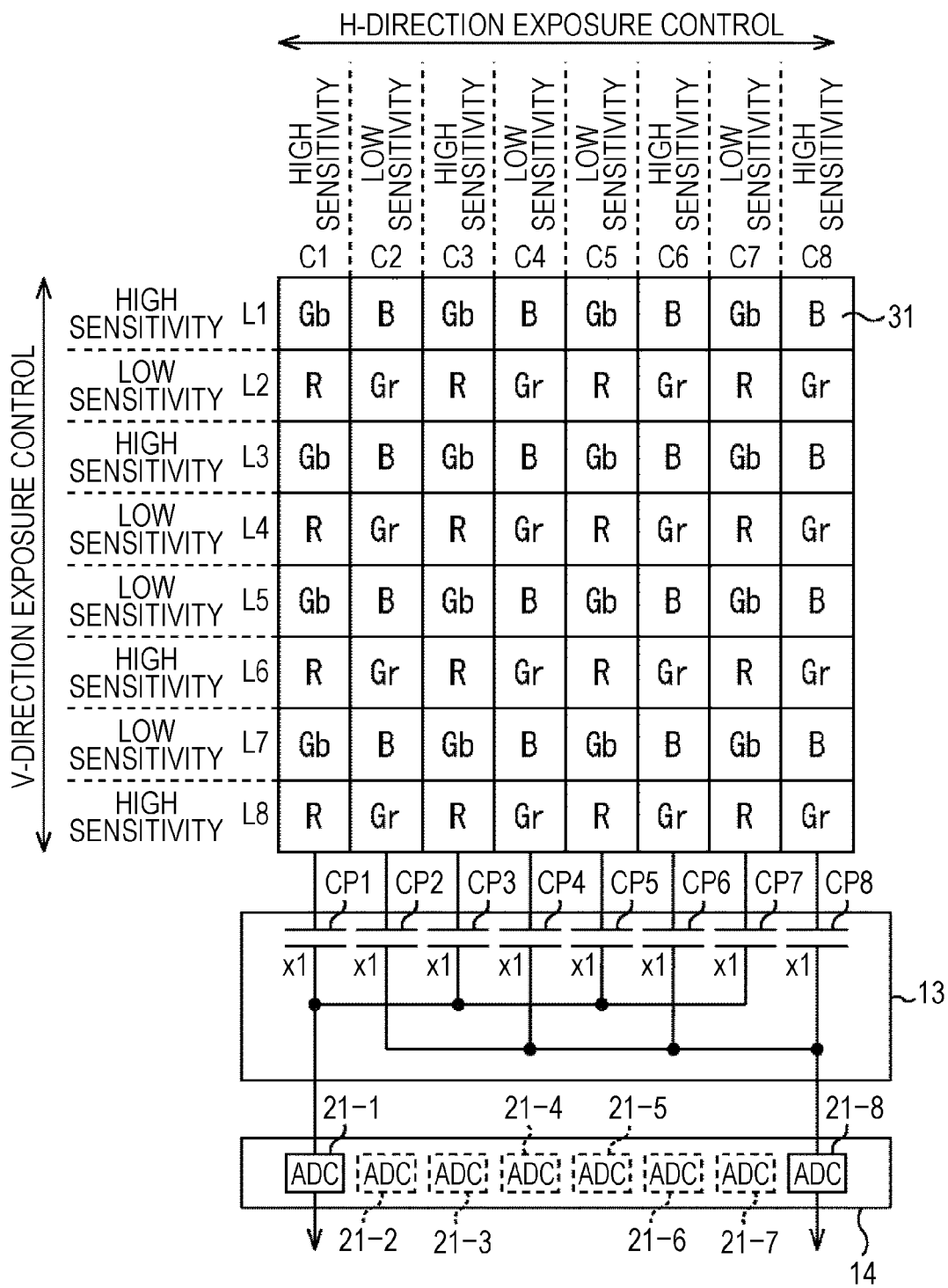
FIG. 15 is a diagram for explaining the second pixel summation method in the 4×4 pixel summing mode.

FIG. 15 shows the structure of the solid-state imaging device 1 in a case where the 4×4 pixel summing mode is executed according to the second pixel summation method. Like FIG. 13, FIG. 15 shows only the portions of the pixel array unit 11, the capacitance summing unit 13, and the AD converter unit 14 related to an 8×8 pixel region.

According to the second pixel summation method, the positions of gravity centers both in the vertical direction and in the horizontal direction are controlled by varying the exposure periods (sensitivities) for the pixels to be combined, as described above.

Specifically, as for the vertical direction, the solid-state imaging device 1 sets the respective pixels 31 of the first, third, sixth, and eighth rows as high-sensitivity pixels to be subjected to long-time exposure. The solid-state imaging device 1 also sets the respective pixels 31 of the second, fourth, fifth, and seventh rows as low-sensitivity pixels to be subjected to short-time exposure.

Here, the sensitivity ratio between the low-sensitivity pixels and the high-sensitivity pixels in the vertical direction is set at 1:7. That is, the ratio between the exposure period for the low-sensitivity pixels and the exposure period for the high-sensitivity pixels in the vertical direction is 1:7.

As for the horizontal direction, the solid-state imaging device 1 sets the respective pixels 31 of the first, third, sixth, and eighth columns as high-sensitivity pixels to be subjected to long-time exposure. The solid-state imaging device 1 also sets the respective pixels 31 of the second, fourth, fifth, and seventh columns as low-sensitivity pixels to be subjected to short-time exposure.

Here, the sensitivity ratio between the low-sensitivity pixels in the horizontal direction and the high-sensitivity pixels to be subjected to long-time exposure is set at 1:7. That is, the ratio between the exposure period for the low-sensitivity pixels and the exposure period for the high-sensitivity pixels in the horizontal direction is 1:7.

Meanwhile, in the capacitance summing unit 13, the capacitive element CP1 of the first column, the capacitive element CP3 of the third column, the capacitive element CP5 of the fifth column, and the capacitive element CP7 of the seventh column are connected in parallel. The capacitance ratio among the capacitive element CP1, the capacitive element CP3, the capacitive element CP5, and the capacitive element CP7 is set at CP1:CP3:CP5:CP7=1:1:1:1. The pixel signals accumulated in the capacitive element CP1, the capacitive element CP3, the capacitive element CP5, and the capacitive element CP7 are combined, and are then output to the ADC 21-1 of the first column in the AD converter unit 14.

Also, the capacitive element CP2 of the second column, the capacitive element CP4 of the fourth column, the capacitive element CP6 of the sixth column, and the capacitive element CP8 of the eighth column are connected in parallel. The capacitance ratio among the capacitive element CP2, the capacitive element CP4, the capacitive element CP6, and the capacitive element CP8 is set at CP2:CP4:CP6:CP8=1:1:1:1. The pixel signals accumulated in the capacitive element CP2, the capacitive element CP4, the capacitive element CP6, and the capacitive element CP8 are combined, and are then output to the ADC 21-8 of the eighth column in the AD converter unit 14.

In the 4×4 pixel summing mode according to the second pixel summation method, the ADCs 21-2 through 21-7 are not used, either. Accordingly, the power supply to each unused ADC 21 can be cut off, and power consumption can be reduced.

Figure 16:
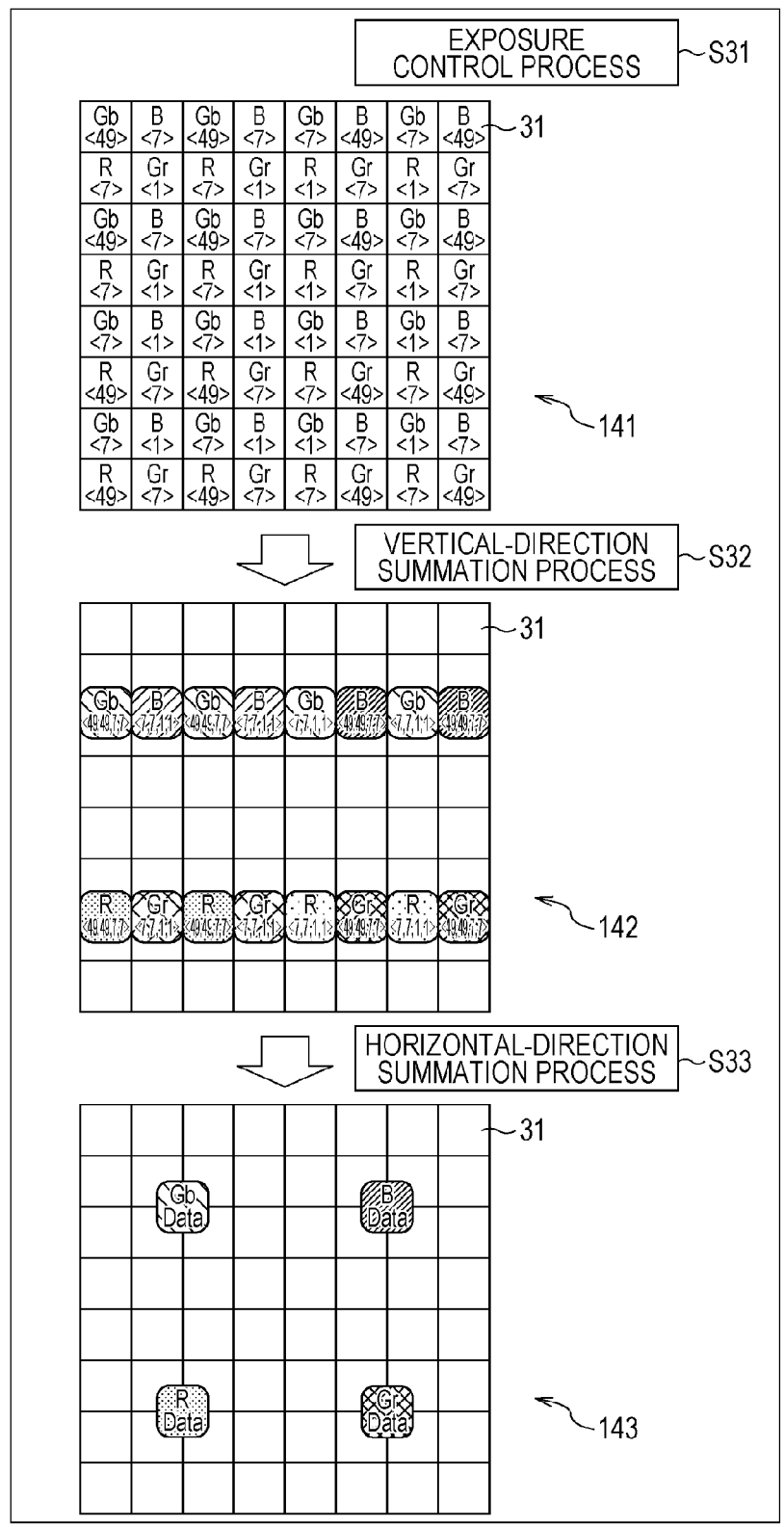
FIG. 16 is a diagram for explaining the processing procedures in the 4×4 pixel summing mode according to the second pixel summation method.

Referring now to FIG. 16, the processing procedures to be carried out in a case where the 4×4 pixel summing mode is executed according to the second pixel summation method are described.

First, in step S31, an exposure control process is performed on the respective pixels 31 in the pixel array unit 11. Through this process, a predetermined exposure period is set on each of the pixels 31 in the pixel array unit 11, and exposure is conducted.

A pixel map 141 shown in FIG. 16 indicates the ratios among the exposure periods for the respective 8×8 pixels 31 as the unit of processing in generating an R pixel signal, a Gb pixel signal, a Gr pixel signal, and a B pixel signal in the 4×4 pixel summing mode.

The values shown in the angle brackets in the respective pixels 31 in the pixel map 141 indicate the exposure periods for the respective pixels 31, with the reference period being the exposure period (1) for the pixels 31 having the shortest exposure period. The exposure period for the pixels 31 that are set at the low sensitivity both in the horizontal direction and in the vertical direction is "1", the exposure period for the pixels 31 that are set at the high sensitivity only either in the horizontal direction or in the vertical direction is "7", and the exposure period for the pixels 31 that are set at the high sensitivity both in the horizontal direction and in the vertical direction is "49".

In step S32, a vertical-direction summation process is performed. Specifically, the pixel signals of the low-sensitivity pixels 31 and the high-sensitivity pixels 31 aligned in the vertical direction as the current summation targets are simultaneously read, so that the pixel signals of the pixels aligned in the vertical direction as the current summation targets are combined, and are accumulated in the capacitive element CP in the capacitance summing unit 13. The capacitive element CP in the capacitance summing unit 13 accumulates the vertically-summed pixel signals generated by combining the pixel signals of the pixels aligned in the vertical direction as the current summation targets.

A pixel map 142 shown in FIG. 16 is a conceptual diagram showing the positions of the gravity centers of the vertically-summed pixel signals generated through the vertical-direction summation process in the 8×8 pixel region.

In the pixel map 142, the values <49, 49, 7, 7> in the angle brackets indicate that each vertically-summed pixel signal is a signal generated by combining the pixel signals of four pixels having exposure periods "49", "49", "7", and "7". Also, the values <7, 7, 1, 1> in the angle brackets indicate that each vertically-summed pixel signal is a signal generated by combining the pixel signals of four pixels having exposure periods "7", "7", "1", and "1".

In step S33, a horizontal-direction summation process is performed. Specifically, the pixel signals accumulated in the capacitive elements CP to be combined in the capacitance summing unit 13 are simultaneously output, so that the pixel signals of the pixels aligned in the horizontal direction as the current summation targets are combined. The pixel signals to be combined here are vertically-summed pixel signals generated through summation processes performed in the vertical direction. Accordingly, through the process in step S33, weighted summation is performed on the pixel signals of the pixels to be combined both in the vertical direction and in the horizontal direction, to generate horizontally- and vertically-summed pixel signals.

A pixel map 143 shown in FIG. 14 is a conceptual diagram showing the positions of the gravity centers of the horizontally- and vertically-summed pixel signals generated through the horizontal-direction summation process in the 8×8 pixel region. The output positions of the pixel signals of R, Gb, Gr, and B are evenly set in the pixel map 143. Thus, according to the second pixel summation method, a low-resolution image with reduced image quality deterioration can be output.

In the 4×4 pixel summing mode, according to either of the first pixel summation method and the second pixel summation method, of the ADCs 21 that are the same in number as the pixel columns, ¾ of the ADCs 21 can rest, and power consumption can be reduced. In a case where the AD converter unit 14 of the solid-state imaging device 1 is formed beforehand with ADCs 21 of ¾ of the number of the pixel columns, operation can be performed at a frame rate four times as high.

<Example of a Combination of the First Pixel Summation Method and the Second Pixel Summation Method>

In the above described examples, the first pixel summation method and the second pixel summation method have been described as methods for realizing the low-resolution mode.

The first pixel summation method is a method of controlling the positions of the gravity centers of output pixel signals by setting different exposure periods in the vertical direction and setting different capacitance ratios among the capacitive elements CP of the capacitance summing unit 13 in the horizontal direction.

The second pixel summation method is a method of controlling the positions of the gravity centers of output pixel signals by setting different exposure periods both in the vertical direction and in the horizontal direction.

In a case where the first pixel summation method is employed as a method for realizing the low-resolution mode, the exposure periods in one row are uniform. Accordingly, the number of wires among the pixel drive lines 17 that control exposure and reading of the pixels 31 can be reduced, and wide opening regions can be secured in the pixels.

In a case where the second pixel summation method is employed as a method for realizing the low-resolution mode, on the other hand, the degree of freedom in controlling the exposure periods for the respective pixels 31 is increased, and accordingly, various weight ratios can be flexibly selected during execution.

In a case where the solid-state imaging device 1 is formed on a semiconductor substrate such as a silicon substrate, the above described first pixel summation method or the above described second pixel summation method is selected, and a circuit configuration that is compatible only with the selected method can be employed as a configuration for realizing the low-resolution mode.

Alternatively, the solid-state imaging device 1 can be designed so that both the first pixel summation method and the second pixel summation method can be selectively implemented.

The following is a description of the structure of the solid-state imaging device 1 that can selectively implement, in a 2×2 pixel summing mode, for example, both the first pixel summation method and the second pixel summation method in conjunction with the all-pixel reading mode.

Figure 17:
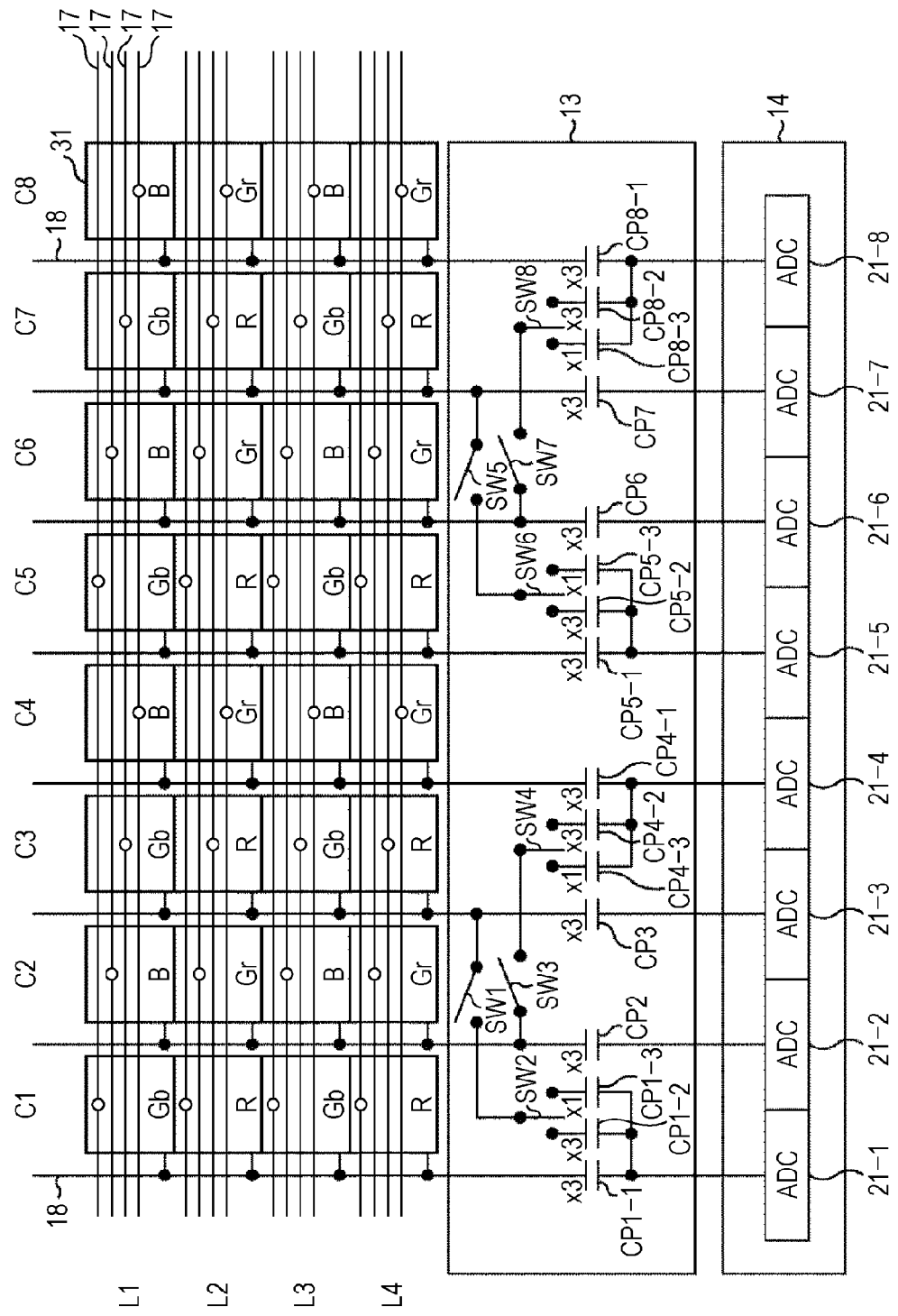
FIG. 17 is a diagram schematically showing the structure of a solid-state imaging device that uses both the first pixel summation method and the second pixel summation method.

FIG. 17 is a diagram schematically showing the structure of the solid-state imaging device 1 that can selectively implement both the first pixel summation method and the second pixel summation method in conjunction with the all-pixel reading mode.

FIG. 17 shows only a portion (the pixels 31 of the first through fourth rows and the first through eighth columns) of the pixel array unit 11, and the portions of the capacitance summing unit 13 and the AD converter unit 14 corresponding to the portion of the pixel array unit 11.

In each of the pixel rows in the pixel array unit 11, four pixel drive lines 17 are provided so as to set different exposure periods for four kinds of pixels in the horizontal direction, for example. The vertical signal lines 18 are provided in the respective pixel columns in the pixel array unit 11.

The capacitance summing unit 13 includes three capacitive elements CP1-1, CP1-2, and CP1-3 as the capacitive element CP1 connected to the ADC 21-1 of the first column in the AD converter unit 14. These three capacitive elements CP1-1, CP1-2, and CP1-3 are connected in parallel, and the capacitance ratio is set at CP1-1:CP1-2:CP1-3=3:3:1. The pixel signals accumulated in the capacitive element CP1 are output to the ADC 21-1.

The capacitance summing unit 13 also includes a capacitive element CP2 connected to the ADC 21-2 of the second column in the AD converter unit 14, and a capacitive element CP3 connected to the ADC 21-3 of the third column in the AD converter unit 14. The capacitances of the capacitive elements CP2 and CP3 are the same as the capacitances of the capacitive elements CP1-1 and CP1-2. The pixel signals accumulated in the capacitive element CP2 are output to the ADC 21-2, and the pixel signals accumulated in the capacitive element CP3 are output to the ADC 21-3.

The capacitance summing unit 13 also includes three capacitive elements CP4-1, CP4-2, and CP4-3 as the capacitive element CP4 connected to the ADC 21-4 of the fourth column in the AD converter unit 14. These three capacitive elements CP4-1, CP4-2, and CP4-3 are connected in parallel, and the capacitance ratio is set at CP4-1:CP4-2:CP4-3=3:3:1. The pixel signals accumulated in the capacitive element CP4 are output to the ADC 21-4.

The capacitance summing unit 13 further includes select switches SW1 through SW4.

The select switch SW1 switches (on and off) connection between the vertical signal line 18 of the third column and the select switch SW2. The select switch SW2 switches between connection to the capacitive element CP1-2 or CP1-3 of the first column and disconnection in which the select switch SW2 is not connected to either of the capacitive elements CP1-2 and CP1-3.

The select switch SW3 switches connection between the vertical signal line 18 of the second column and the select switch SW4. The select switch SW4 switches between connection to the capacitive element CP4-2 or CP4-3 of the fourth column and disconnection in which the select switch SW4 is not connected to either of the capacitive elements CP4-2 and CP4-3.

The capacitance summing unit 13 has the same structure for the fifth through eighth columns as the structure for the first through fourth columns.

Specifically, the capacitance summing unit 13 includes three capacitive elements CP5-1, CP5-2, and CP5-3 as the capacitive element CP5 connected to the ADC 21-5 of the fifth column in the AD converter unit 14. These three capacitive elements CP5-1, CP5-2, and CP5-3 are connected in parallel, and the capacitance ratio is set at CP5-1:CP5-2:CP5-3=3:3:1. The pixel signals accumulated in the capacitive element CP5 are output to the ADC 21-5.

The capacitance summing unit 13 also includes a capacitive element CP6 connected to the ADC 21-6 of the sixth column in the AD converter unit 14, and a capacitive element CP7 connected to the ADC 21-7 of the seventh column in the AD converter unit 14. The capacitances of the capacitive elements CP6 and CP7 are the same as the capacitances of the capacitive elements CP5-1 and CP5-2. The pixel signals accumulated in the capacitive element CP6 are output to the ADC 21-6, and the pixel signals accumulated in the capacitive element CP7 are output to the ADC 21-7.

The capacitance summing unit 13 also includes three capacitive elements CP8-1, CP8-2, and CP8-3 as the capacitive element CP8 connected to the ADC 21-8 of the eighth column in the AD converter unit 14. These three capacitive elements CP8-1, CP8-2, and CP8-3 are connected in parallel, and the capacitance ratio is set at CP8-1:CP8-2:CP8-3=3:3:1. The pixel signals accumulated in the capacitive element CP8 are output to the ADC 21-8.

The capacitance summing unit 13 further includes select switches SW5 through SW8.

The select switch SW5 switches (on and off) connection/disconnection between the vertical signal line 18 of the seventh column and the select switch SW6. The select switch SW6 switches between connection to the capacitive element CP5-2 or CP5-3 of the fifth column and disconnection in which the select switch SW6 is not connected to either of the capacitive elements CP5-2 and CP5-3.

The select switch SW7 switches connection between the vertical signal line 18 of the sixth column and the select switch SW8. The select switch SW8 switches between connection to the capacitive element CP8-2 or CP8-3 of the eighth column and disconnection in which the select switch SW8 is not connected to either of the capacitive elements CP8-2 and CP8-3.

<Example Connections in the all-Pixel Mode>

In the solid-state imaging device 1 designed as described above, when the operation mode is the all-pixel reading mode, all the select switches SW1 through SW8 are disconnected as shown in FIG. 17.

In this case, the pixel signals of the respective pixels 31 of the first column are accumulated only into the capacitive element CP1-1 through the vertical signal line 18 of the first column, and are then output to the ADC 21-1. The pixel signals of the respective pixels 31 of the second column are accumulated into the capacitive element CP2 through the vertical signal line 18 of the second column, and are then output to the ADC 21-2. The pixel signals of the respective pixels 31 of the third column are accumulated into the capacitive element CP3 through the vertical signal line 18 of the third column, and are then output to the ADC 21-3. The pixel signals of the respective pixels 31 of the fourth column are accumulated only into the capacitive element CP1-4 through the vertical signal line 18 of the fourth column, and are then output to the ADC 21-4. The capacitance ratio among the capacitive element CP1-1, the capacitive element CP2, the capacitive element CP3, and the capacitive element CP4-1 is CP1-1:CP2:CP3:CP4-1=3:3:3:3.

Accordingly, the pixel signals generated at the respective pixels 31 in the pixel array unit 11 are not weighted (or have uniform weights), and are output to the ADCs 21.

The same applies to the fifth through eighth columns, and the other columns.

In this manner, the all-pixel reading mode can be executed in the solid-state imaging device 1.

<Example Connections in a Case where the First Pixel Summation Method is Implemented>

Figure 18:
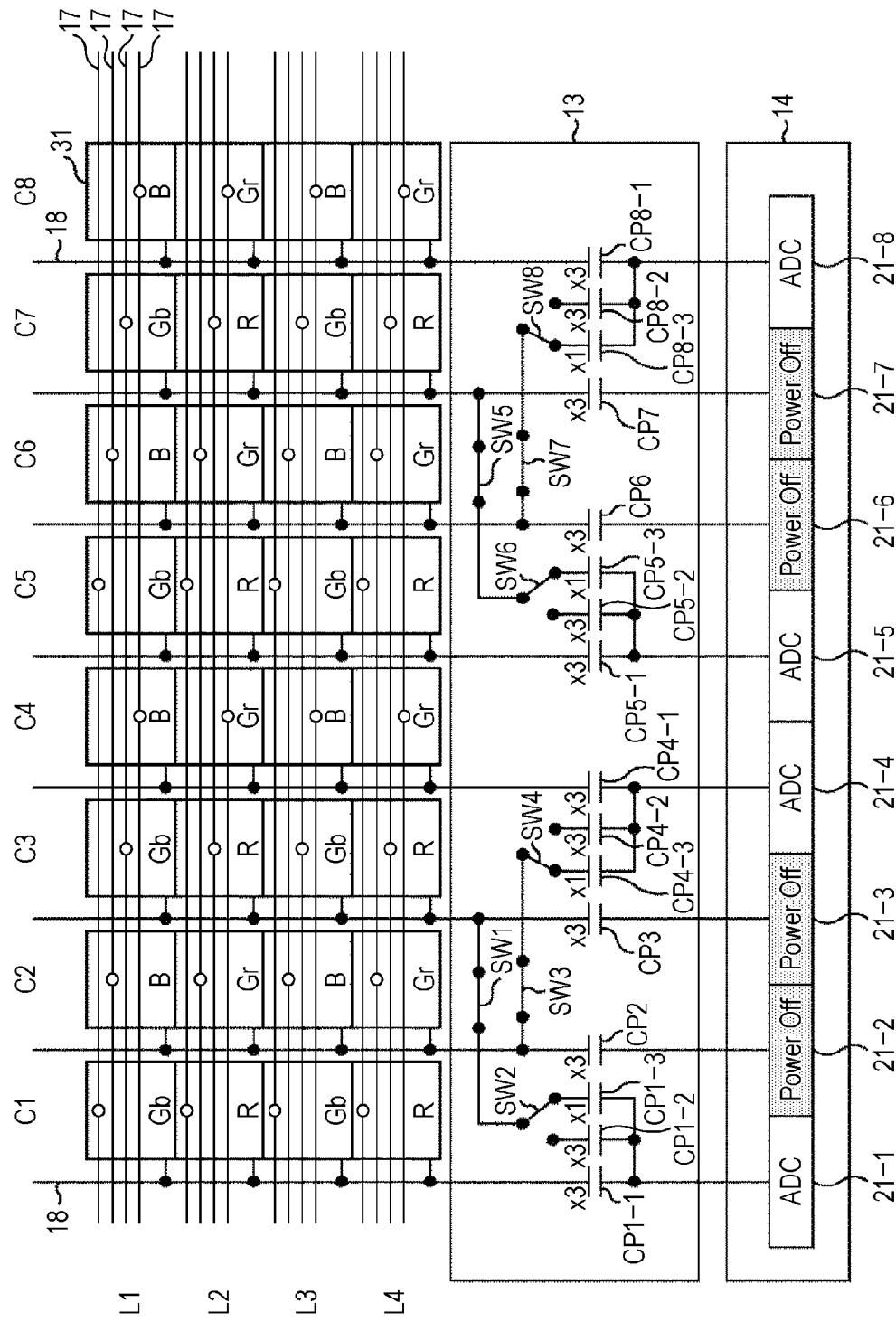
FIG. 18 is a diagram for explaining example connections in a case where the first pixel summation method is implemented.

FIG. 18 shows example connections in the capacitance summing unit 13 in a case where the first pixel summation method is selected to execute the 2×2 pixel summing mode.

In a case where the 2×2 pixel summing mode is executed according to the first pixel summation method, the capacitance summing unit 13 puts the select switches SW1 and SW3 into a connected (ON) state. Also, the capacitance summing unit 13 connects the select switch SW2 to the capacitive element CP1-3, and connects the select switch SW4 to the capacitive element CP4-3.

Likewise, the capacitance summing unit 13 puts the select switches SW5 and SW7 into a connected (ON) state. Also, the capacitance summing unit 13 connects the select switch SW6 to the capacitive element CP5-3, and connects the select switch SW8 to the capacitive element CP8-3.

In the case where the select switches SW1 through SW7 are connected in this manner, the pixel signals of the respective pixels 31 of the first column are accumulated into the capacitive element CP1-1 through the vertical signal line 18 of the first column. The pixel signals of the respective pixels 31 of the third column are accumulated into the capacitive element CP1-3 through the vertical signal line 18 of the third column via the select switches SW1 and SW2. The capacitance ratio between the capacitive element CP1-1 and the capacitive element CP1-3 is CP1-1:CP1-3=3:1. The pixel signals accumulated in the capacitive element CP1-1 and the capacitive element CP1-3 are combined, and are then output to the ADC 21-1.

Also, the pixel signals of the respective pixels 31 of the second column are accumulated into the capacitive element CP4-3 through the vertical signal line 18 of the second column via the select switches SW3 and SW4. The pixel signals of the respective pixels 31 of the fourth column are accumulated into the capacitive element CP4-1 through the vertical signal line 18 of the fourth column. The capacitance ratio between the capacitive element CP4-1 and the capacitive element CP4-3 is CP4-1:CP4-3=3:1. The pixel signals accumulated in the capacitive element CP4-1 and the capacitive element CP4-3 are combined, and are then output to the ADC 21-4.

Likewise, the pixel signals of the respective pixels 31 of the fifth column are accumulated into the capacitive element CP5-1 through the vertical signal line 18 of the fifth column. The pixel signals of the respective pixels 31 of the seventh column are accumulated into the capacitive element CP5-3 through the vertical signal line 18 of the seventh column via the select switches SW5 and SW6. The capacitance ratio between the capacitive element CP5-1 and the capacitive element CP5-3 is CP5-1:CP5-3=3:1. The pixel signals accumulated in the capacitive element CP5-1 and the capacitive element CP5-3 are combined, and are then output to the ADC 21-5.

Also, the pixel signals of the respective pixels 31 of the sixth column are accumulated into the capacitive element CP8-3 through the vertical signal line 18 of the sixth column via the select switches SW7 and SW8. The pixel signals of the respective pixels 31 of the eighth column are accumulated into the capacitive element CP8-1 through the vertical signal line 18 of the eighth column. The capacitance ratio between the capacitive element CP8-1 and the capacitive element CP8-3 is CP8-1:CP8-3=3:1. The pixel signals accumulated in the capacitive element CP8-1 and the capacitive element CP8-3 are combined, and are then output to the ADC 21-8.

In this manner, the 2×2 pixel summing mode according to the first pixel summation method can be executed. Since the ADC 21-2, the ADC 21-3, the ADC 21-6, and the ADC 21-7 are not used in the 2×2 pixel summing mode, the power supply to these ADCs can be cut off, and power consumption can be reduced.

<Example Connections in a Case where the Second Pixel Summation Method is Implemented>

Figure 19:
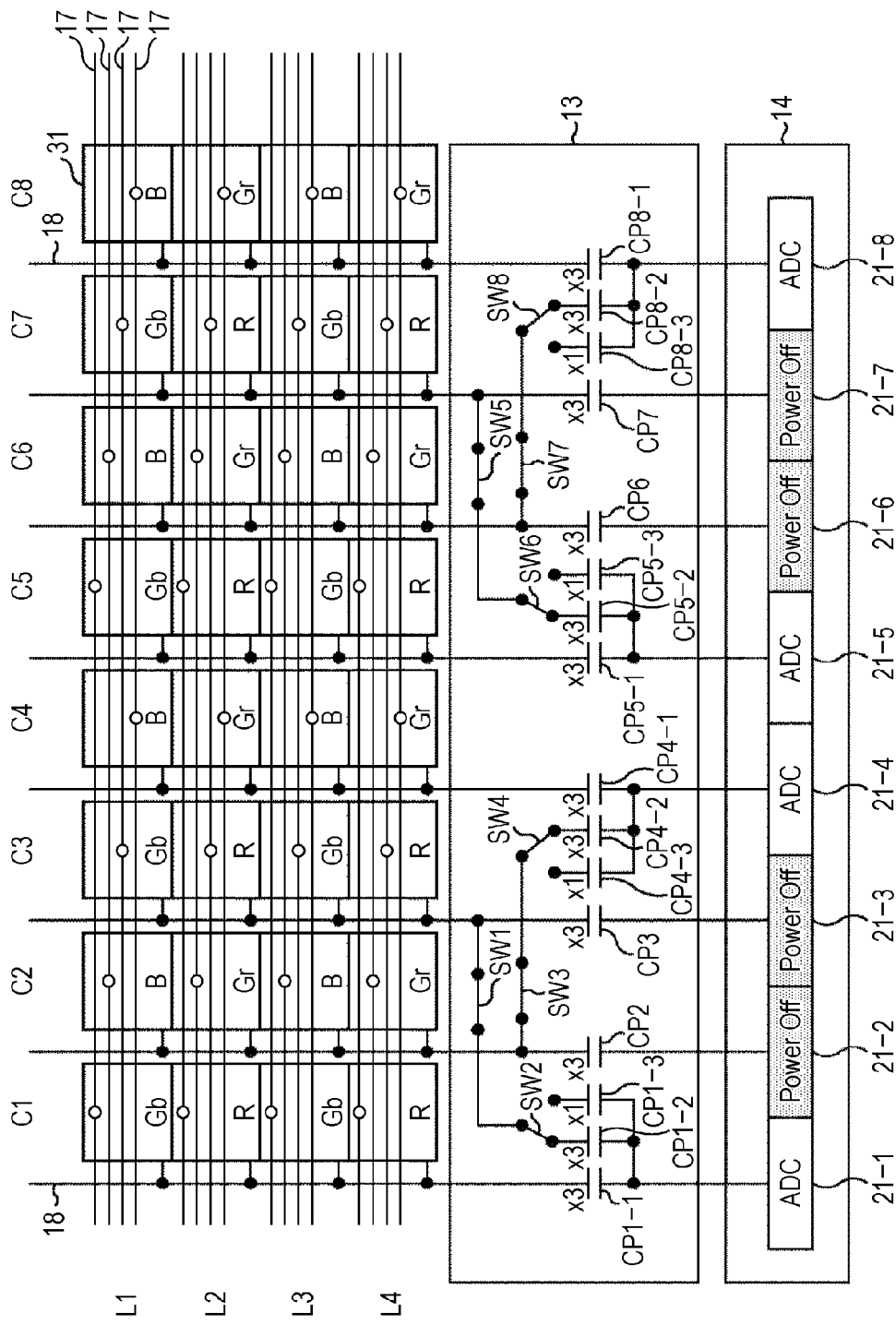
FIG. 19 is a diagram for explaining example connections in a case where the second pixel summation method is implemented.

FIG. 19 shows example connections in the capacitance summing unit 13 in a case where the second pixel summation method is selected to execute the 2×2 pixel summing mode.

In a case where the 2×2 pixel summing mode is executed according to the second pixel summation method, the capacitance summing unit 13 puts the select switches SW1 and SW3 into a connected (ON) state. Also, the capacitance summing unit 13 connects the select switch SW2 to the capacitive element CP1-2, and connects the select switch SW4 to the capacitive element CP4-2.

Likewise, the capacitance summing unit 13 puts the select switches SW5 and SW7 into a connected (ON) state. Also, the capacitance summing unit 13 connects the select switch SW6 to the capacitive element CP5-2, and connects the select switch SW8 to the capacitive element CP8-2.

In the case where the select switches SW1 through SW7 are connected in this manner, the pixel signals of the respective pixels 31 of the first column are accumulated into the capacitive element CP1-1 through the vertical signal line 18 of the first column. The pixel signals of the respective pixels 31 of the third column are accumulated into the capacitive element CP1-2 through the vertical signal line 18 of the third column via the select switches SW1 and SW2. The capacitance ratio between the capacitive element CP1-1 and the capacitive element CP1-2 is CP1-1:CP1-2=3:3. The pixel signals accumulated in the capacitive element CP1-1 and the capacitive element CP1-2 are combined, and are then output to the ADC 21-1.

Also, the pixel signals of the respective pixels 31 of the second column are accumulated into the capacitive element CP4-2 through the vertical signal line 18 of the second column via the select switches SW3 and SW4. The pixel signals of the respective pixels 31 of the fourth column are accumulated into the capacitive element CP4-1 through the vertical signal line 18 of the fourth column. The capacitance ratio between the capacitive element CP4-1 and the capacitive element CP4-2 is CP4-1:CP4-2=3:3. The pixel signals accumulated in the capacitive element CP4-1 and the capacitive element CP4-2 are combined, and are then output to the ADC 21-4.

Likewise, the pixel signals of the respective pixels 31 of the fifth column are accumulated into the capacitive element CP5-1 through the vertical signal line 18 of the fifth column. The pixel signals of the respective pixels 31 of the seventh column are accumulated into the capacitive element CP5-2 through the vertical signal line 18 of the seventh column via the select switches SW5 and SW6. The capacitance ratio between the capacitive element CP5-1 and the capacitive element CP5-2 is CP5-1:CP5-2=3:3. The pixel signals accumulated in the capacitive element CP5-1 and the capacitive element CP5-2 are combined, and are then output to the ADC 21-5.

Also, the pixel signals of the respective pixels 31 of the sixth column are accumulated into the capacitive element CP8-2 through the vertical signal line 18 of the sixth column via the select switches SW7 and SW8. The pixel signals of the respective pixels 31 of the eighth column are accumulated into the capacitive element CP8-1 through the vertical signal line 18 of the eighth column. The capacitance ratio between the capacitive element CP8-1 and the capacitive element CP8-2 is CP8-1:CP8-2=3:3. The pixel signals accumulated in the capacitive element CP8-1 and the capacitive element CP8-2 are combined, and are then output to the ADC 21-8.

In this manner, the 2×2 pixel summing mode according to the second pixel summation method can be executed. Since the ADC 21-2, the ADC 21-3, the ADC 21-6, and the ADC 21-7 are not used in the 2×2 pixel summing mode, the power supply to these ADCs can be cut off, and power consumption can be reduced.

As described above, the circuit configuration of the solid-state imaging device 1 can be a circuit configuration that can selectively implement the first pixel summation method and the second pixel summation method in executing the low-resolution mode.

Although not shown in the drawings, the solid-state imaging device 1 can also have a circuit configuration that selectively executes the above described 2×2 pixel summing mode and the above described 4×4 pixel summing mode.

Furthermore, although the N×N (N being an integer of 2 or greater) pixel summing modes in which the pixel number reduction rate is the same between the horizontal direction and the vertical direction have been described above, it is possible to employ a circuit configuration that executes an M×N (M being an integer that differs from N and is equal to or greater than 2) pixel summing mode in which the pixel number reduction rate differs between the horizontal direction and the vertical direction.

<Example Application to Electronic Apparatuses>

The above described solid-state imaging device 1 can be used in various kinds of electronic apparatuses, such as imaging apparatuses like digital still cameras and digital video cameras, portable telephone devices having imaging functions, and other apparatuses having imaging functions.

Figure 20:
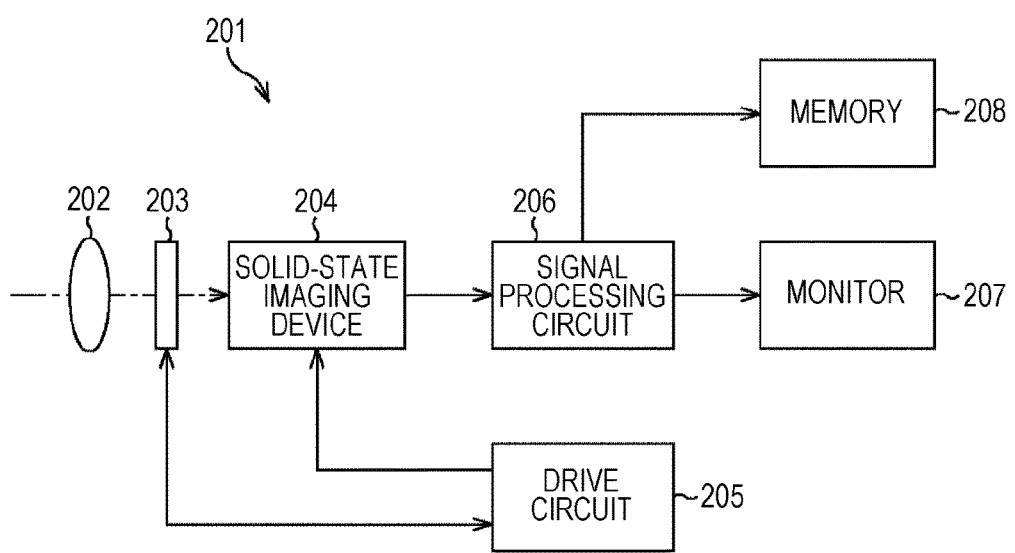
FIG. 20 is a block diagram showing an example structure of an imaging apparatus as an electronic apparatus to which the present technology is applied.

FIG. 20 is a block diagram showing an example structure of an imaging apparatus as an electronic apparatus to which the present technology is applied.

The imaging apparatus 201 shown in FIG. 20 includes an optical system 202, a shutter device 203, a solid-state imaging device 204, a drive circuit 205, a signal processing circuit 206, a monitor 207, and a memory 208, and can take still images and moving images.

The optical system 202 includes one or more lenses to guide light (incident light) from an object to the solid-state imaging device 204, and form an image on the light receiving surface of the solid-state imaging device 204.

The shutter device 203 is placed between the optical system 202 and the solid-state imaging device 204, and, under the control of the drive circuit 205, controls the light emission period and the light blocking period for the solid-state imaging device 204.

The solid-state imaging device 204 is formed with the above described solid-state imaging device 1. In accordance with light that is emitted to form an image on the light receiving surface via the optical system 202 and the shutter device 203, the solid-state imaging device 204 accumulates signal charges for a certain period of time. The signal charges accumulated in the solid-state imaging device 204 are transferred in accordance with a drive signal (timing signal) supplied from the drive circuit 205. The solid-state imaging device 204 may be formed as a single chip, or may be formed as part of a camera module, being packaged together with the optical system 202 and the signal processing circuit 206.

The drive circuit 205 outputs the drive signal that controls the transfer operation of the solid-state imaging device 204 and the shutter operation of the shutter device 203, to drive the solid-state imaging device 204 and the shutter device 203.

The signal processing circuit 206 performs various kinds of signal processing on pixel signals that are output from the solid-state imaging device 204. The image (image data) obtained through the signal processing performed by the signal processing circuit 206 is supplied to and displayed on the monitor 207, or is supplied to and stored (recorded) into the memory 208.

It should be noted that embodiments of the present technology are not limited to the above described embodiments, and various modifications may be made to them without departing from the scope of the present technology.

For example, it is possible to employ a combination of all or some of the above described embodiments.

The present technology can also be in the following forms.

(1)

A solid-state imaging device including:

a pixel summing unit that outputs a horizontally- and vertically-summed pixel signal by combining pixel signals of a plurality of pixels that are aligned in a vertical direction and have different weights, and pixel signals of a plurality of pixels that are aligned in a horizontal direction and have different weights, the pixels being arranged in a matrix fashion; and an AD converter unit that performs AD conversion on the horizontally- and vertically-summed pixel signal output from the pixel summing unit.

(2)

The solid-state imaging device of (1), wherein the pixel summing unit generates the pixel signals of the pixels that are aligned in the vertical direction and have the different weights by controlling and varying exposure periods for the pixels aligned in the vertical direction.

(3)

The solid-state imaging device of (1) or (2), wherein the pixel summing unit includes: accumulating units that accumulate the pixel signals, the accumulating units corresponding to pixel columns; and an accumulation summing unit to which the accumulating units are connected in parallel, the accumulating units corresponding to the pixels to be combined in the horizontal direction.

(4)

The solid-state imaging device of one of (1) through (3), wherein capacitance ratios of the accumulating units connected in parallel are equivalent to the weights of the pixels to be combined in the horizontal direction, and the pixel summing unit combines the pixel signals of the pixels that are aligned in the horizontal direction and have the different weights by combining the pixel signals that are accumulated in the accumulating units having different capacitance ratios and are of the pixels that are aligned in the horizontal direction and have uniform exposure periods.

(5)

The solid-state imaging device of one of (1) through (3), wherein capacitance ratios of the accumulating units connected in parallel are uniform, and the pixel summing unit combines the pixel signals of the pixels that are aligned in the horizontal direction and have the different weights by combining the pixel signals that are accumulated in the accumulating units and are of the pixels that are aligned in the horizontal direction and have different exposure periods.

(6)

The solid-state imaging device of one of (1) through (3), wherein capacitance ratios of the accumulating units connected in parallel can be changed, and the pixel summing unit combines the pixel signals of the pixels that are aligned in the horizontal direction and have the different weights by selectively performing summation of the pixel signals that are accumulated in the accumulating units having uniform capacitance ratios and are of the pixels that are aligned in the horizontal direction and have different exposure periods, or summation of the pixel signals that are accumulated in the accumulating units having capacitance ratios equivalent to the weights of the pixels to be combined in the horizontal direction and are of the pixels that are aligned in the horizontal direction and have uniform exposure periods.

(7)

The solid-state imaging device of one of (1) through (6), wherein the pixel summing unit outputs the horizontally- and vertically-summed pixel signal by combining pixel signals of two pixels of the same color in a pixel row and a pixel column.

(8)

The solid-state imaging device of one of (1) through (6), wherein the pixel summing unit outputs the horizontally- and vertically-summed pixel signal by combining pixel signals of four pixels of the same color in a pixel row and a pixel column.

(9)

A method of driving a solid-state imaging device, including:

outputting a horizontally- and vertically-summed pixel signal by combining pixel signals of a plurality of pixels that are aligned in a vertical direction and have different weights, and pixel signals of a plurality of pixels that are aligned in a horizontal direction and have different weights, the pixels being arranged in a matrix fashion; and performing AD conversion on the output horizontally- and vertically-summed pixel signal, the solid-state imaging device outputting the horizontally- and vertically-summed pixel signal and performing the AD conversion.

(10)

An electronic apparatus including a solid-state imaging device, the solid-state imaging device including:

a pixel summing unit that outputs a horizontally- and vertically-summed pixel signal by combining pixel signals of a plurality of pixels that are aligned in a vertical direction and have different weights, and pixel signals of a plurality of pixels that are aligned in a horizontal direction and have different weights, the pixels being arranged in a matrix fashion; and an AD converter unit that performs AD conversion on the horizontally- and vertically-summed pixel signal output from the pixel summing unit.

REFERENCE SIGNS LIST

1 Solid-state imaging device
11 Pixel array unit
12 Vertical drive unit
13 Capacitance summing unit
14 AD converter unit
15 Horizontal drive unit
16 System control unit
21 ADC
31 Pixel
201 Imaging apparatus
204 Solid-state imaging device

The invention claimed is:

1. A solid-state imaging device, comprising:
a pixel summing unit configured to output an analog horizontally-summed pixel signal and an analog vertically-summed pixel signal based on a combination of pixel signals of a plurality of pixels, of pixels arranged in a matrix fashion, that are aligned in a vertical direction and have different weights, and pixel signals of a plurality of pixels, of the pixels arranged in the matrix fashion, that are aligned in a horizontal direction and have different weights; and
an analog to digital (AD) converter unit configured to convert the analog horizontally-summed pixel signal and the analog vertically-summed pixel signal into digital signals,
wherein the pixel summing unit is further configured to generate the pixel signals of the plurality of pixels that are aligned in the vertical direction and have the different weights based on variation of exposure periods for the plurality of pixels that are aligned in the vertical direction.

2. The solid-state imaging device according to claim 1, wherein the pixel summing unit includes:
accumulating units configured to accumulate pixel signals of the pixels, the accumulating units corresponding to pixel columns; and
an accumulation summing unit to which the accumulating units are connected in parallel, the accumulating units corresponding to pixels to be combined in the horizontal direction.

3. The solid-state imaging device according to claim 2, wherein
capacitance ratios of the accumulating units connected in parallel are equivalent to weights of the pixels to be combined in the horizontal direction, and
the pixel summing unit is further configured to combine the pixel signals of the plurality of pixels that are aligned in the horizontal direction and have the different weights based on a combination of the pixel signals that are accumulated in the accumulating units having different capacitance ratios and are of the plurality of pixels that are aligned in the horizontal direction and have uniform exposure periods.

4. The solid-state imaging device according to claim 2, wherein
capacitance ratios of the accumulating units connected in parallel are uniform, and
the pixel summing unit is further configured to combine the pixel signals of the plurality of pixels that are aligned in the horizontal direction and have the different weights based on a combination of the pixel signals that are accumulated in the accumulating units and are of the plurality of pixels that are aligned in the horizontal direction and have different exposure periods.

5. The solid-state imaging device according to claim 2, wherein
capacitance ratios of the accumulating units connected in parallel is variable, and
the pixel summing unit is further configured to combine the pixel signals of the plurality of pixels that are aligned in the horizontal direction and have the different weights based on a summation of the pixel signals that are accumulated in the accumulating units having uniform capacitance ratios and are of the plurality of pixels that are aligned in the horizontal direction and have different exposure periods, or a summation of the pixel signals that are accumulated in the accumulating units having capacitance ratios equivalent to weights of the pixels to be combined in the horizontal direction and are of the plurality of pixels that are aligned in the horizontal direction and have uniform exposure periods.

6. The solid-state imaging device according to claim 1, wherein the pixel summing unit is further configured to output the analog horizontally-summed pixel signal and the analog vertically-summed pixel signal based on a combination of pixel signals of two pixels of a same color in a pixel row and a pixel column.

7. The solid-state imaging device according to claim 1, wherein the pixel summing unit is further configured to output the analog horizontally-summed pixel signal and the analog vertically-summed pixel signal based on a combination of pixel signals of four pixels of a same color in a pixel row and a pixel column.

8. A method of driving a solid-state imaging device, comprising:
outputting an analog horizontally-summed pixel signal and an analog vertically-summed pixel signal by combining pixel signals of a plurality of pixels, of pixels arranged in a matrix fashion, that are aligned in a vertical direction and have different weights, and pixel signals of a plurality of pixels, of the pixels arranged in the matrix fashion, that are aligned in a horizontal direction and have different weights;
converting the analog horizontally-summed pixel signal and the analog vertically-summed pixel signal into digital signals; and
generating the pixel signals of the plurality of pixels that are aligned in the vertical direction and have the different weights based on variation of exposure periods for the plurality of pixels that are aligned in the vertical direction.

9. An electronic apparatus comprising a solid-state imaging device,
the solid-state imaging device including:
a pixel summing unit configured to output an analog horizontally-summed pixel signal and an analog vertically-summed pixel signal based on a combination of the pixel signals of a plurality of pixels, of pixels arranged in a matrix fashion, that are aligned in a vertical direction and have different weights, and pixel signals of a plurality of pixels, of pixels arranged in a matrix fashion, that are aligned in a horizontal direction and have different weights; and
an analog to digital (AD) converter unit configured to convert the analog horizontally-summed pixel signal and the analog vertically-summed pixel signal into digital signals,
wherein the pixel summing unit is further configured to generate the pixel signals of the plurality of pixels that are aligned in the vertical direction and have the different weights based on variation of exposure periods for the plurality of pixels that are aligned in the vertical direction.

* * * * *